United States Patent [19]

Shiraki et al.

[11] Patent Number: 4,994,508

[45] Date of Patent: Feb. 19, 1991

[54] SPECIFIC HYDROGENATED BLOCK COPOLYMER COMPOSITION AND PROCESS FOR PRODUCING THE SAME

[75] Inventors: Toshinori Shiraki, Yamato; Yasuo Hattori, Yokohama, both of Japan

[73] Assignee: Asahi Kasei Kogyo Kabushiki Kaisha, Osaka, Japan

[21] Appl. No.: 219,236

[22] Filed: Jul. 14, 1988

[30] Foreign Application Priority Data

| Jul. 16, 1987 | [JP] | Japan | 62-175859 |
| Oct. 14, 1987 | [JP] | Japan | 62-257267 |
| Oct. 15, 1987 | [JP] | Japan | 62-258260 |

[51] Int. Cl.$^5$ ............ C08K 7/06; C08L 51/04; C08L 53/02; C08L 95/00
[52] U.S. Cl. .................. 524/14; 524/13; 524/68; 524/128; 524/171; 524/271; 524/272; 524/274; 524/323; 524/504; 524/505; 525/57; 525/63; 525/64; 525/66; 525/67; 525/68; 525/69; 525/71; 525/74; 525/77; 525/78; 525/92
[58] Field of Search ............ 524/68, 425, 271, 272, 524/274, 504, 505, 128, 171, 323, 13, 14; 525/285, 301, 67, 68, 66, 69, 71, 73, 74, 77, 79, 80, 88, 89, 83, 63, 64, 57, 92

[56] References Cited

U.S. PATENT DOCUMENTS

| 3,239,478 | 3/1966 | Harlan, Jr. . |
| 3,299,174 | 1/1967 | Kuhre et al. . |
| 3,792,124 | 2/1974 | Davison et al. . |
| 3,801,529 | 4/1974 | Potter . |
| 3,810,957 | 5/1974 | Lunk . |
| 3,975,460 | 8/1976 | Davison et al. . |
| 4,007,311 | 2/1977 | Harlan, Jr. . |
| 4,041,103 | 8/1977 | Davison et al. . |
| 4,088,711 | 5/1978 | Gergen et al. . |
| 4,101,605 | 7/1978 | Gergen et al. . |
| 4,110,303 | 8/1978 | Gergen et al. . |
| 4,167,507 | 9/1979 | Haaf . |
| 4,188,432 | 2/1980 | Holden et al. . |
| 4,242,470 | 12/1980 | Gergen et al. . |
| 4,264,747 | 4/1981 | Paddock . |
| 4,330,449 | 5/1982 | Maldonada et al. . |
| 4,474,924 | 10/1984 | Powers et al. . |
| 4,738,884 | 4/1988 | Algrim et al. ............ 524/68 |

FOREIGN PATENT DOCUMENTS

| 0085115 | 8/1983 | European Pat. Off. . |
| 1279644 | 6/1972 | United Kingdom . |
| 1329298 | 9/1973 | United Kingdom . |
| 1341922 | 12/1973 | United Kingdom . |
| 1405786 | 9/1975 | United Kingdom . |
| 1559052 | 1/1980 | United Kingdom . |

Primary Examiner—Allan Lieberman
Attorney, Agent, or Firm—Birch, Stewart, Kolasch & Birch

[57] ABSTRACT

A composition comprising,
(a) 1 to 99 parts by weight of a specific hydrogenated product of a block copolymer having at least one polymer block composed mainly of a vinyl aromatic compound and at least one polymer block composed mainly of a conjugated diene compound, a modified product which comprises said product modified with an $\alpha,\beta$-unsaturated carboxylic acid or a derivative thereof, or a mixture of said product and said modified product, wherein the content of the vinyl aromatic compound prior to hydrogenation is 5 to 95% by weight and a content of vinyl linkages [V] prior to hydrogenation which originated from the conjugated diene compound is 10 to 80%, said product satisfying the following conditions;
(1) the hydrogenated ratio [A] of the total of aliphatic double bonds which originated from the conjugated diene compound is not lower than 5% and lower than 50%, and $$[B]/[V]^{\frac{1}{2}} = 3 \text{ to } 20 \qquad (2)$$

wherein [B] is the hydrogenated ratio of the vinyl linkage portions which originated from the conjugated diene compound, and
(b) 99 to 1 parts by weight of at least one thermoplastic substance selected from the group consisting of tackifier resins, thermoplastic resins and bituminous materials, and a process for producing the same.

29 Claims, No Drawings

SPECIFIC HYDROGENATED BLOCK COPOLYMER COMPOSITION AND PROCESS FOR PRODUCING THE SAME

TECHNICAL FIELD

The present invention relates to a block copolymer composition comprising a combination of a product obtained by specifically hydrogenating a block copolymer having at least one polymer block composed mainly of a vinyl aromatic compound and at least one polymer block composed mainly of a conjugated diene compound having a content of vinyl linkages originating from the conjugated diene compound within a specific range prior to hydrogenation (hereinafter abbreviated as "a specific hydrogenated block copolymer"), and at least one thermoplastic substance selected from tackifier resins, thermoplastic resins or bituminous substances.

The composition comprising a combination of the specific hydrogenated block copolymer and a tackifier resin according to the present invention is a tacky composition that is excellent in initial tackiness, adhesive strength, creep resistance and is improved in treatment performance at high temperature, which is particularly suitably useful for adhesive tapes, labels, etc.

Further, the composition comprising a combination of the specific hydrogenated block copolymer and the thermoplastic resin according to the present invention is a composition having excellent impact resistance, compatibility, heat aging resistance and low temperature properties.

Yet further, the composition comprising the specific hydrogenated block copolymer of the present invention and the bituminous material is a bituminous composition having excellent low temperature properties and heat aging resistance, as well as having a good softening point, penetration and strength, and is a composition which is suitable as an asphalt pavement for roads, a water-proof sheet, a sound-shielding sheet, roofing, etc.

BACKGROUND ART

A block copolymer comprising a conjugated diene and a vinyl aromatic hydrocarbon is different from natural rubbers and conventional synthetic rubbers. The block copolymer has strength and elastic characteristics which is equal to vulcanized elastomers at room temperature, without having been vulcanized by the use of a vulcanization agent, an accelerator and a filler such as carbon black, etc. The block copolymer also exhibits good processability which is similar to that of thermoplastics at high temperatures, and therefore it is now utilized in very wide scope of fields by the utilization of these characteristics. Examples of the applications of the block copolymer may include- an injection molded products such as hoses, footwares, window frames, vessels, toys, domestic articles, etc., as well as extrusion molded products, blow molded products, cohesives, adhesives, modified asphalts, modified thermoplastic resins, thermosetting resins, vulcanized rubbers, etc.

In the various uses described above, the adhesives has been used in various products, such as an adhesive tape, a label, etc. For the application of an adhesive onto tapes, there has generally been a method employed in which an adhesive solution containing an adhesive dissolved in a solvent is coated onto a substrate by means of rollers coating, spray, etc. However, the use of such solvents involve many problems with respect to pollution of the atmosphere, fire, work environment, hygiene, etc., and it is recently regarded as being a serious social problem. Accordingly, as the means for solving such inconvenience, a hot melt adhesive of the non-solvent type has recently attracted attention.

As the base polymer for a hot melt adhesives, there have been employed various polymers such as ethylene-vinyl acetate copolymer, a block copolymer comprising a conjugated diene and a vinyl aromatic hydrocarbon, ethylene-α-olefin copolymer, polyester resin, etc., but among the above, the block copolymer is preferably used because of having a relatively good balance between tackiness and creep resistance. For example, Canadian Patent No. 742758 and U.S. Pat. No. 3427269 disclose adhesive compositions containing a linear-chain block copolymer such as polystyrene-polybutadiene-polystyrene or polystyrenepolyisoprene-polystyrene, etc. Also, Japanese Patent Publication Examined No. 49958/1981 discloses a hot melt adhesive composition comprising a branched-chain block copolymer of (polystyrene-polybutadiene)$_n$X.

On the other hand, a primary use of the block copolymer is to use it in combination with inorganic fillers or organic fillers, thermoplastic resins, etc. For example, U.K. Patent No. 1092563, U.S. Pat. Nos. 3459830 and 4107124 describe the use of compositions comprising a thermoplastic resin such as polystyrene, polyethylene, etc., a softener such as a naphthenic oil, etc., an inorganic filler such as clay, calcium carbonate, etc., formulated in footwares. Also, U.K. Patent No. 1105585, U.S. Pat. No. 3637554 and U.K. Patent No. 1077769 describe methods for improving impact resistance by formulating the above-described block copolymer in polystyrene or a rubber-modified polystyrene. Similarly, U.S. Pat. Nos. 3294868 and 3459831, Japanese Patent Publications Examined Nos. 5067/1971 and 1867/1971, and West Germany Patent Publication No. 2255930 describe attempts to improve the characteristics by formulating the above-described block copolymer in polypropyrene, polyethylene, an acrylic resin, a vinyl chloride resin, and a polyphenylene ether resin, respectively.

It has been known that the properties of a bituminous material which is brittle and susceptible to impact destruction at low temperature or susceptible to plastic deformation at high temperature can be improved to increase its durability by mixing therewith a natural rubber or a synthetic rubber such as styrene-butadiene rubber, a nitrile rubber, etc., and such compositions have been already utilized for civil engineering, construction, industry, typically uses for roads in Japan or in various foreign countries.

For preparing a rubber-mixed bituminous composition, there is a method in which a rubber is mixed with a bituminous material on open rollers to prepare a masterbatch having a high rubber content and the masterbatch is mixed with a bituminous material, heated and melted to be dissolved therein. In another method, a rubber in a form of powder or latex is mixed with a bituminous material heated and melted to be dissolved therein. Recently in particular, a bituminous composition mixed with a block copolymer having an excellent solubility characteristic in the composition during mixing and being relatively lower in viscosity at high temperature, is preferably used rather than a bituminous composition mixed with a natural rubber or a synthetic rubber which has been previously conventionally used. For example, U.K. Patent No. 1177725 discloses a bituminous composition which contains a block copolymer of a vinyl aromatic compound and a conjugated diene compound dissolved therein.

However, in the use of adhesives, since the block copolymer comprising styrene and butadiene is inferior in initial tackiness the use of a block copolymer comprising styrene and isoprene having excellent characteristics for an adhesive tape and an adhesive label for which initial tackiness is particularly demanded, has recently been increased. However, a block copolymer comprising styrene and isoprene will be changed in viscosity and physical properties by cleavage of molecular chains caused by heat degradation, when the adhesive composition is left to stand at high temperature for a long period of time. Accordingly, an improvement is still desired.

On the other hand, a block copolymer comprising styrene and butadiene, though free from cleavage of molecular chains, has the problem in that it is inferior in initial tackiness. Various investigations have been conducted in the prior art concerning improving the initial tackiness of a block copolymer comprising styrene and butadiene. For example, U.K. Patent No. 1447419 discloses a method in which a hydrogenated resin of an aromatic petroleum resin prepared by hydrogenating a petroleum resin obtained by polymerization of petroleum distillates containing a polymerizable aromatic hydrocarbon as a main component at a ratio of 40 to 80% of hydrogenation in the nucleus of aromatic components, is used as the tackifier resin. On the other hand, in Japanese Patent Publication Unexamined No. 2375/1982, there is disclosed a method in which a hydrogenated resin having a softening point of 50 to 160 °C. is used. The resin is prepared by heating a distillate at 220 ° C. to 320 ° C. and copolymerizing it, and further subjected to hydrogenation. The distillate has a concentration of dicyclopentadiene concentration of 10 to 70% and a concentration of tetrahydroindene and/or vinylcyclohexene of 30 to 80%. The distillate is obtained by distilling off most of the vinyl norbornene which is the main product contained in the reaction mixture resulting from the Diels-Alder reaction of 1,3-butadiene and cyclopentadiene. However, even according to such a method, an improvement of initial tackiness of the resin formed is still unsatisfactory and an improvement is still desired.

Also, U.K. Patent No. 1405786 describes a method in which polystyrene-hydrogenated polybutadiene-polystyrene or polystyrene-hydrogenated polyisoprene-polystyrene is used for improving the adhesive properties of the composition at relatively high temperature conditions. Among them are adhesive compositions which are a block copolymer comprising a vinyl aromatic compound and a conjugated diene compound. However, the compositions described in the patent have the problem of being inferior in initial tackiness.

A composition comprising a block copolymer of a vinyl aromatic hydrocarbon and a conjugated diene formulated in a thermoplastic resin is generally inferior in high temperature moldability, and when molding is performed at a relatively high temperature for the purpose of improving productivity during the molding of said composition, which results in the ensuing problems such as the impact resistance being abruptly lowered or that the desired performance cannot be obtained even when molding is being conducted by formulating a block copolymer in an engineering plastic, etc., for which molding at high temperature is required.

Accordingly, for the purpose of improving high temperature moldability, it has been attempted to formulate in a thermoplastic resin, a block copolymer obtained by hydrogenating a block copolymer of a vinyl aromatic hydrocarbon and a conjugated diene to convert a conjugated diene polymer block to a saturated olefin polymer block. For example, U.K. Pat. Nos. 1581167 and 1559052 describe a composition, in which a block copolymer having 80% or more, more preferably 99% or more of its aliphatic double bond portions which originated from a hydrogenated conjugated diene, is formulated in an engineering plastic. However, in such a composition, the compatibility of the hydrogenated block copolymer with the thermoplastic resin is inferior, which results in such problems as the possible occurrence of a layer peel-off phenomenon of the molded product of the composition, depending upon the formulated amount. Also, due to having an inferior lower temperature characteristic, no desired performance can be exhibited at lower temperatures.

Further, in a composition comprising a bituminous material mixed with a block copolymer, when dissolving is conducted at a temperature which is higher than a conventional dissolving temperature in order to improve the productivity during processing by further shortening the dissolving time, or when the dissolving time is shortened during the mixing of a block copolymer having a relatively higher molecular weight which can be dissolved only with difficulty, or when processing and working are practiced at higher temperatures in order to improve the workability by lowering the viscosity after mixing, the problem involved is that the block copolymer suffers from heat degradation to provide a bituminous composition having none of the desired physical properties. In order to improve the heat aging properties of the block copolymer, it has also been attempted to use a completely hydrogenated block copolymer in which its aliphatic double bond portions which originated from the butadiene compound in the block copolymer is hydrogenated to 90% or more, generally to substantially 100%. However, a composition which comprises such a completely hydrogenated block copolymer is inferior in low temperature properties, and would thus have the problem of the flexibility thereof being worsened at cold temperatures.

In view of the state of the art described above, the present inventors have studied intensively to improve initial tackiness and heat treatment performance at high temperature of an adhesive composition by the use of a block copolymer comprising an aromatic compound and a conjugated diene compound, and to obtain a composition having excellent heat aging resistance, moldability at high temperature, compatibility, impact resistance and low temperature properties by the use of a thermoplastic resin, inorganic or organic filler, etc., in combination with the block copolymer, and further to obtain a bituminous composition having excellent low temperature properties and heat aging resistance and also having a good softening point, penetration and strength. The present inventors consequently have found that these purposes can be accomplished by using a block copolymer which is specifically hydrogenated at its aliphatic double bond portions which originated from the conjugated diene compound. And accordingly, the present invention has been completed.

DISCLOSURE

More specifically, the present invention relates to a composition comprising, (a) 1 to 99 parts by weight of a specific hydrogenated product of a block copolymer having at least one polymer block composed mainly of a vinyl aromatic compound and at least one polymer block composed mainly of a conjugated diene compound, a modified product which comprises said product modified with an $\alpha,\beta$-unsaturated carboxylic acid or a derivative thereof, or a mixture of said product and said modified product, wherein the content of the vinyl aromatic compound prior to hydrogenation is 5 to 95% by weight and a content of vinyl linkages [V] prior to hydrogenation which originated from the conjugated diene compound is 10 to 80%, said product satisfying the following conditions;

(1) the hydrogenated ratio [A] of the total of aliphatic double bonds which originated from the conjugated diene compound is not lower than 5% and lower than 50%, and $$[B]/[V]^{\frac{1}{2}} = 3 \text{ to } 20, \qquad (2)$$

wherein [B] is the hydrogenated ratio of the vinyl linkage portions which originated from the conjugated diene compound, and (b) 99 to 1 parts by weight of at least one thermoplastic substance selected from the group consisting of tackifier resins, thermoplastic resins and bituminous materials, and a process for producing the same.

In the present composition, (1) when the thermoplastic material of component (b) is a tackifier resin, the ratio of component (b) per 100 parts by weight of component (a) should be preferably 20 to 200 parts by weight, (2) when the thermoplastic material of component (b) is a thermoplastic resin or a bituminous material, the weight ratio of component (a) to component (b) should be preferably 99/1 to 1/99.

The specific hydrogenated block copolymer to be used as component (a) in the present invention comprises a hydrogenated product of a block copolymer comprising at least one, preferably two or more polymer block A composed mainly of a vinyl aromatic compounds and at least one polymer block B composed mainly of a conjugated diene, having a content of vinyl linkages [V] prior to hydrogenation which originated from the conjugated diene compound being 10 to 80%, preferably 15 to 70%, more preferably 20 to 65%, and the hydrogenated ratio [A] of the total of the aliphatic double bond portions which originated from the conjugated diene compound in said copolymer is not lower than 5% and lower than 50%, preferably 10 to 45% more preferably 15 to 40%, and further the hydrogenated ratio [B] of the vinyl linkage portions which originated from the conjugated diene compound in said copolymer is satisfied by the following equation; $[B]/[V]^{\frac{1}{2}} = 3$ to 20, preferably $[B]/[V]^{\frac{1}{2}} = 5$ to 18, more preferably $[B]/[V]^{\frac{1}{2}} = 7$ to 16.

When the content of vinyl linkage [V] based on the conjugated diene compound prior to hydrogenation is lower than 10% or higher than 80%, the adhesive composition is undesirably inferior in initial tackiness. On the other hand, the thermoplastic resin composition and the bituminous composition are undesirably inferior in compatibility in the respective composition when content of the vinyl linkages prior to hydrogenation is lower than 10%, and they are undesirably inferior in low temperature properties when the content exceeds 80%. When the hydrogenated ratio [A] of the total of aliphatic double bond portions which originated from the conjugated diene compound in the block copolymer is lower than 5%, the heat aging resistance is inferior, while when it is not lower than 50%, the initial tackiness and low temperature properties are inferior. Further, when $[B]/[V]^{\frac{1}{2}}$ is lower than 3, the initial tackiness, and the creep resistance in the adhesive composition are inferior, and the heat aging resistance of the thermoplastic resin composition and the bituminous composition are inferior.

When $[B]/[V]^{\frac{1}{2}}$ exceeds 20, the initial tackiness in the adhesive composition is inferior, and the low temperature properties and compatibility in the thermoplastic resin composition are inferior, and also the low temperature properties in the bituminous composition is inferior.

The content of vinyl linkages prior to hydrogenation which originated from the conjugated diene compound in the present invention is defined by the ratio of the amount of the conjugated diene compounds incorporated in the bonding configuration of 1,2-linkage and 3,4-linkage among the total amount of the conjugated diene compounds incorporated in the bonding configurations of 1,2-linkage, 3,4-linkage and 1,4-linkage in the block copolymer. The content of vinyl linkages prior to hydrogenation can be defined by IR spectrophotometer, NMR device, etc. And, the hydrogenated ratio [A] of the total of the aliphatic double bond portions which originated from the conjugated diene compound is defined by a ratio of the amount of aliphatic double bonds hydrogenated and converted to saturated hydrocarbon bonds among the total of the aliphatic double bonds prior to hydrogenation, both of which originated from the conjugated diene compound incorporated in the block copolymer. Further, the hydrogenated ratio [B] of the vinyl linkage portions which originated from the conjugated diene compound is defined by the ratio of the amount of aliphatic double bonds hydrogenated and converted to saturated hydrocarbon bonds among the amount of aliphatic double bonds prior to hydrogenation, both of which originated from the conjugated diene compound as incorporated in the bonding configurations of 1,2-linkage and 3,4-linkage in the block copolymer. [B] is not higher than 100%. The hydrogenated ratio [A] and [B] can be defined by IR spectrophotometer, NMR device, etc. When the hydrogenated ratio is grasped from the hydrogenated block copolymer, the method by means of NMR device can be effectively used.

The content of a vinyl aromatic compound in the specific hydrogenated block copolymer of the present invention may be 5 to 95% by weight, preferably 10 to 90% by weight, more preferably 15 to 85% by weight. The block copolymer exhibits the characteristics of a thermoplastic elastomer when the content of the vinyl aromatic compound is not higher than 60 % by weight, preferably not higher than 55% by weight, while it exhibits the characteristics as a thermoplastic resin, when the content of the vinyl aromatic compound exceeds 60% by weight, and is preferably at least 65% by weight.

In the present invention, in order to obtain an adhesive composition having good initial tackiness, a rubbery thermoplastic resin composition or a thermoplastic resin composition having good impact resistance, or further a bituminous composition having good flexibility and adhesiveness, it is preferable to use a block copolymer having a vinyl aromatic compound content of 5 to 60% by weight, preferably 10 to 55% by weight, and more preferably 15 to 50% by weight.

As a method for preparing the block copolymer before hydrogenation to be used in the present invention, any known method may be available, provided that the contents of vinyl aromatic compound and vinyl linkages are within the ranges specified in the present invention. For example, there may be enumerated the methods as described in U.K. Patent Nos. 895980 and 1130770, Japanese Patent Publications Examined Nos. 31951/1970, 32415/1971 and 2423/1973, U.S. Pat. Nos. 3639517 and 3281383, Japanese Patent Publication No. 49567/1976 and U.K. Patent No.1436812, etc.

These are methods of block copolymerizing a conjugated diene and a vinyl aromatic compound by using a polymerization initiator such as an organic lithium compound, etc. in a hydrocarbon solvent, to provide block copolymers represented by the formulae; $(A-B)_n$, $A+B-A)_n$, $B+A-B)_n$ (wherein A is a polymer segment composed mainly of a vinyl aromatic compound, B is a polymer segment composed mainly of a conjugated diene, and n is an integer of 1 or more, and wherein the boundary between A segment and B segment is not necessarily required to be clearly distinct), or block copolymers represented by the formulae;

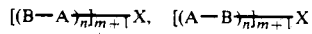
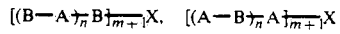

(wherein A and B are the same as defined above, X represents a residue of an initiator such as polyfunctional organic lithium compound, etc., or a coupling agent such as silicon tetrachloride, tin tetrachloride, a polyepoxide such as epoxidized soybean oil, etc., a polyhalogenated hydrocarbon, a carboxylic acid ester, a polyacid anhydride, a polyisocyanate, a polyaldehyde, a polyketone, a polyvinyl compound, etc., m and n are each an integer of 1 or more). In the above-described formulae, the polymer segment composed mainly of a vinyl aromatic compound represents a copolymer block of a vinyl aromatic compound and a conjugated diene containing 50% by weight or more of a vinyl aromatic compound and/or a vinyl aromatic compound homopolymer block, and the polymer block composed mainly of a conjugated diene represents a copolymer block of a conjugated diene and a vinyl aromatic compound having a content of the conjugated diene exceeding 50% by weight and/or a conjugated diene homopolymer block.

A vinyl aromatic compound in the copolymer block may be distributed either uniformly or distributed in a taper. The portions uniformly distributed and/or the portions distributed in a taper may also co-exist in plural numbers in each block.

The block copolymer to be used in the present invention may be any mixture of the block copolymers represented by the above-described formulae.

The conjugated diene to be used in the present invention may include a diolefin having a pair of conjugated double bonds, such as 1,3-butadiene, 2-methyl-1,3-butadiene(isoprene), 2,3-dimethyl-1,3-butadiene, 1,3-pentadiene, 1,3-hexadiene, etc. As particularly general ones, 1,3-butadiene, isoprene are preferred. These can be used not only as a single type but as a mixture of two or more types.

Examples of a vinyl aromatic compound to be used in the present invention may include styrene, o-methylstyrene, p-methylstyrene, p-tert-butylstyrene, 1,3-dimethylstyrene, α-methylstyrene, vinyl naphthalene, vinyl anthracene and the like. As a particularly general one, styrene is preferred. These can be used not only as a single type but as a mixture of two or more types.

The content of vinyl linkages [V] can be controlled in the polymerization method by using an organic lithium compound as the initiator in a hydrocarbon solvent, by using a polar compound as the vinyl modifier and controlling the type and the amount of the polar compound used and controlling the polymerization temperature, etc.

As the hydrocarbon solvent, there may be used aliphatic hydrocarbons such as butane, pentane, hexane, isopentane, heptane, octane, isooctane, etc., alicyclic hydrocarbons such as cyclopentane, methylcyclopentane, cyclohexane, methylcyclo-hexane, ethylcyclohexane, etc., or aromatic hydrocarbons such as benzene, toluene, ethylbenzene, xylene, etc. As the organic lithium catalyst, there may be included organic monolithium compounds, organic dilithium compounds, organic trilithium compounds etc. Specific examples of these may include ethyllithium, n-propyllithium, isopropyllithium, n-butyllithium, sec-butyllithium, tert-butyllithium, hexamethylenedilithium, butadienyldilithium, isoprenyldilithium, and the like. As the polar compound, there may be included ethers such as tetrahydrofuran, diethylene glycol dimethyl ether, diethylene glycol dibutyl ether, etc.; amines such as triethylamine, tetramethylethylenediamine, etc.; thioethers; phosphines; phosphoramides; alkylbenzenesulfonic acid salts; potassium or sodium alkoxides, etc.

As the block copolymer to be used in the present invention before hydrogenation, a block copolymer having an atomic group containing a polar group bonded to at least one polymer chain terminal of the block copolymer can be used. By bonding an atomic group containing a polar group to the polymer chain terminal, it is possible to improve the creep resistance characteristic of the adhesive composition, and to improve the compatibility and the impact resistance properties, etc. in the thermoplastic resin composition. This will also improve the compatibility and the adhesive characteristics in the bituminous composition. Herein, the atomic group containing the polar group refers to an atomic group containing a polar group containing at least one of the following atoms selected from nitrogen, oxygen, silicon, phosphorus, sulfur and tin. Specific examples may include atomic groups containing at least one polar group selected from carboxyl group, carbonyl group, thiocarbonyl group, acid halide group, acid anhydride group, carboxylic acid group, thiocarboxylic acid group, aldehyde group, thioaldehyde group, carboxylic acid ester group, amide group, sulfonic acid group, sulfonic acid ester group, phosphoric acid group, phosphoric acid ester group, amino group, imino group, nitrile group, pyridyl group, quinoline group, epoxy group, thioepoxy group, sulfide group, isocyanate group, isothiocyanate group, halogenated silicon group, alkoxysilicon group, halogenated tin group, alkyltin group, phenyltin group, etc. More specifically, among the terminal-modified block copolymers described in Japanese Patent Application No. 84639/1987, the terminal-modified block copolymers having a content of vinyl linkages within the range of the present invention can be used. The terminal-modifying treating agent for imparting an atomic group containing a polar group can be used in an amount of 0.5 to 2 mols, preferably 0.7 to 1.3 mols per 1 atom equivalent of lithium metal at the terminal of the polymer chain.

The specific hydrogenated block copolymer to be used in the present invention may have a number average molecular weight of 5,000 to 1,000,000, preferably 10,000 to 800,000, more preferably 30,000 to 300,000, and the number average molecular weight of the block copolymer before hydrogenation should preferably be controlled within this range.

Next, the above-described block copolymer is subjected to hydrogenation reaction. As the catalyst to be used in the hydrogenation reaction, there have been known (1) the carried type heterogeneous catalyst having a metal such as Ni, Pt, Pd, Ru, etc., carried on a carrier such as carbon, silica, alumina, diatomaceous earth, etc. and (2) the homogeneous catalyst such as the so-called Ziegler type catalyst by use of an organic acid salt or an acetyl acetone salt of Ni, Co, Fe, Cr, etc., and a reducing agent such as organic aluminum, etc., or the so-called organic complex catalyst such as organic metal compound of Ru, Rh, etc. As specific methods, according to the ones described in U.K. Patent No. 1020720, U.S. Pat. Nos. 3,333,024, 3,993,855, 4,501,857 and 4,673,714, the block copolymer can be hydrogenated in the presence of a hydrogenation catalyst in an inert solvent to obtain a hydrogenated product, thus synthesizing the specific hydrogenated block copolymer to be provided for the present invention. In this reaction, it is necessary to control the reaction temperature, the reaction time, the amount of hydrogen fed, the amount of the catalyst, etc., so that the hydrogenation may be effected to exhibit the hydrogenated ratio [A] of the total of the aliphatic double bond portions and the hydrogenated ratio [B] of the vinyl linkage portions, respectively, which originated from the conjugated diene compound in the block copolymer within the ranges specified in the present invention. The hydrogenated ratio of the aromatic double bonds which originated from the vinyl aromatic compound copolymerized in the polymer block A composed mainly of a vinyl aromatic compound or optionally copolymerized in the polymer block B composed mainly of a conjugated diene compound is not particularly limited, but it is preferable to control the hydrogenated ratio of the aromatic double bonds to 20% or less.

The specific hydrogenated block copolymer to be used in the present invention or the specific hydrogenated product of the above-described terminal-modified block copolymer may also be modified with $\alpha,\beta$-unsaturated carboxylic acid or its derivative such as anhydride, esterified product, amidated product, imidated product, etc. (hereinafter abbreviated as "$\alpha,\beta$-unsaturated carboxylic acid, etc."). As the modified product of the specific hydrogenated block copolymer (hereinafter abbreviated simply as "modified block copolymer"), one having generally 0.01 to 50 parts by weight, preferably 0.05 to 20 parts by weight, more preferably 0.1 to 10 parts by weight of $\alpha,\beta$-unsaturated carboxylic acid, etc. grafted to per 100 parts by weight of the block copolymer can be used.

Examples of $\alpha,\beta$-unsaturated carboxylic acid, etc., may include maleic acid, maleic anhydride, maleinimide, fumaric acid, itaconic acid, acrylic acid, methacrylic acid, acrylic acid ester, methacrylic acid ester such as methyl methacrylate, glycidyl methacrylate, etc., crotonic acid, a cis-4-cyclohexene-1,2-dicarboxylic acid, or an anhydride or an imide thereof, and an endo-cis-bicyclo-[2,2,1]-5-heptene-2,3-dicarboxylic acid, or an anhydride or an imide thereof, etc., and among them, maleic anhydride, maleinimide, glycidyl methacrylate are preferred.

A preparation of the modified block copolymer may be performed in either a solution state, a molten state, or the like, and also in either the presence or absence of a radical initiator such as organic peroxides, etc., and not particularly limitative. However, it is not preferable to use a preparation method in which the modified block copolymer contains undesirable components such as gel, etc. or in which the melt viscosity of the copolymer is remarkably increased to worsen processability. A preferable preparation method is exemplified by a method in which the above-described block copolymer, $\alpha,\beta$-unsaturated carboxylic acid, etc. are melted and kneaded in an extruder at 150° to 350° C., preferably 170° to 300° C. either in the presence or absence of an organic peroxide. The modified block copolymer as obtained may be formed into an ionomer with monovalent or divalent or trivalent metal ions. Examples of organic peroxides may include dicumyl peroxide, di-tert-butyl peroxide, tert-butylcumyl peroxide, 2,5-dimethyl-2,5-di(tertbutylperoxy)hexane and 2,5-dimethyl-2,5-di(tert-butylperoxy)hexyne-3-n-butyl-4,4-bis(tert-butylperoxy)valerate, 1,1-bis(tert-butylperoxy)-3,3,5-trimethylcyclohexane, etc.

In the modified block copolymer thus obtained, unreacted $\alpha, \beta$-unsaturated carboxylic acid, etc., generally remain as an unreacted material. The unreacted material may be completely removed or left to remain as such. Particularly, when the modified block copolymer is formulated in the adhesive composition or the bituminous composition, for the purpose of lowering the viscosity of the composition or improving dispersibility, or when the modified block copolymer is formulated in the thermoplastic resin, for the purpose of improving mutual dispersibility, it is preferable to permit the unreacted material to be co-present in an amount of 0.01 to 10 parts by weight, preferably 0.05 to 5 parts by weight per 100 parts by weight of the modified block copolymer.

The graft reaction may also be conducted in the presence of stabilizers such as various phenolic stabilizers, phosphorus-containing stabilizers, sulfur-containing stabilizers, amine group containing stabilizers, etc.

The tackifier resin of the component (b) to be used in the adhesive composition of the present invention may include those conventionally used for hot melt tackifiers, etc. as a tackifier resin, such as a coumarone-indene resin, a phenolic resin, a p-tert-butylphenol-acetylene resin, a phenolformaldehyde resin, a terpene-phenol resin, a polyterpene resin, a xylene-formaldehyde resin, a synthetic polyterpene resin, an aromatic hydrocarbon resin, an aliphatic cyclic-hydrocarbon resin, an oligomer of monoolefin or diolefin, a hydrogenated hydrocarbon resin, a hydrocarbon type tackified resin, polybutene, a polyhydric alcohol ester of rosin, a hydrogenated rosin, a hydrogenated wood rosin, an ester of a hydrogenated rosin with a monoalcohol or a polyhydric alcohol, a turpentine type tackifier, etc. More specifically, those described in "Chemicals Formulated in Rubbers and Plastics" (edited by Rubber Digest Co.) can be used. Particularly a preferable tackifier resin is a terpene type resin, an aromatic-compound-modified terpene resin, an alicyclic saturated petroleum resin, a rosin ester, a disproportionated rosin ester, a completely hydrogenated rosin ester, an aliphatic petroleum resin (a $C_5$-aliphatic petroleum resin, $C_5$, $C_9$-aliphatic-/aromatic petroleum resins, etc.), $C_9$-aromatic petroleum resins and a modified aliphatic petroleum resin, to provide compositions having good initial tackiness.

In the present invention, the tackifier resin of the component (b) may be used suitably within the range of 20 to 200 parts by weight, preferably 40 to 150 parts by weight per 100 parts by weight of the specific hydrogenated block copolymer of the component (a). If the amount of tackifier resin formulated is outside this range, a tendency is observed that the adhesive properties of the adhesive tape, etc., by use of the adhesive composition as obtained is lowered.

In the adhesive composition of the present invention, a softener can be used, if desired. As a softener, a petroleum softener such as paraffinic oils, naphthenic oils, aromatic oils, etc., paraffins, fatty oil softeners, plasticizers, etc., specifically those described in "Chemicals Formulated in Rubbers and Plastics" can be used. The softener may be used in an amount of not more than 150 parts by weight, preferably 5 to 100 parts by weight per 100 parts by weight of the specific hydrogenated block copolymer of component (a). When the amount exceeds 150% by weight, the creep resistance of the adhesive tape, etc. of using the adhesive composition obtained is lowered, whereby the softener is undesirably bled out.

In the adhesive composition of the present invention, as a reinforcing resin, in addition to polystyrene, polyethylene, polypropylene, ethylene-propylene copolymer, ethylene-butene copolymer, ethylene-vinyl acetate copolymer, thermoplastic resins such as thermoplastic polyester type resins having a relatively lower molecular weight, polyamide type resins, polyphenylene ether type resins, etc., can be formulated in an amount of not more than 50 parts by weight, preferably 2 to 40 parts by weight, more preferably 5 to 30 parts by weight per 100 parts by weight of the specific hydrogenated block copolymer of component (a) to improve the creep resistance or hardness. When the amount of the reinforcing resin formulated exceeds 50 parts by weight, the initial tackiness will be undesirably lowered.

For the preparation of the adhesive composition of the present invention, various methods can be used. For example, melting kettle, kneader, mixing roller, extruder, internal mixer, etc., can be used. Kneading temperature in using these kneading devices may generally be 120° to 250 °C., preferably 150° to 220 °C. Also, it can be prepared by dissolving in hydrocarbon type solvents, ether type solvents, ester type solvents, halogenated hydrocarbon type solvents, etc. Further, it can be prepared by mixing component (a) and component (b) in the form of a latex.

In the adhesive composition of the present invention, so long as the characteristics of an adhesive composition are not lost, other conventional elastomers such as a natural rubber, a synthetic isoproprene rubber, a polybutadiene rubber, a styrene-butadiene rubber, a chloroprene rubber, an ethylene-propylene rubber, an acrylic rubber, a polyisopreneisobutylene rubber, a polypentenamer rubber, or a vinyl aromatic hydrocarbon- a conjugated diene block polymers other than those defined in the present invention may also be mixed in the composition.

The thermoplastic resin of component (b) to be used in the thermoplastic resin composition of the present invention may include at least one vinyl aromatic hydrocarbon resin selected from the group consisting of a block copolymer resins of a vinyl aromatic hydrocarbon and a conjugated diene containing 60 to 95% by weight of a vinyl aromatic hydrocarbon outside the scope defined in (a) of the present invention, a polymer of the above-described vinyl aromatic hydrocarbon monomer, a copolymer of the above-described vinyl aromatic hydrocarbon monomer with another vinyl monomer such as ethylene, propylene, butylene, vinyl chloride, vinylidene chloride, vinyl acetate, acrylates such as methyl acrylate, methacrylates such as methyl methacrylate, acrylonitrile, methacrylonitrile, etc., rubber modified styrenic resin (HIPS), etc.; polyethylene resins such as polyethylene, a copolymer of ethylene with another monomer copolymerizable therewith containing 50% or more of ethylene, for example, ethylene-propylene copolymer, ethylene-vinyl acetate copolymer and hydrolyzates thereof, ethylene-acrylic acid ionomer or chlorinated polyethylene; polypropylene resins such as polypropylene, a copolymer of propylene with another monomer copolymerizable therewith containing 50% or more of propylene, for example, propylene-ethylene copolymer, propylene-ethyl acrylate copolymer or chlorinated polypropylene; polybutene resins such as polybutene-1, a copolymer of butene-1 with another monomer copolymerizable therewith; polyvinyl chloride resins such as polyvinyl chloride, polyvinylidene chloride, copolymers of vinyl chloride and/or vinylidene chloride with another monomer copolymerizable therewith containing 50% or more of vinyl chloride and/or vinylidene chloride; polyvinyl acetate resins which are a copolymer of vinyl acetate with another copolymerizable monomer containing 50% or more of vinyl acetate, and hydrolyzates thereof; polyacrylate resins such as a polymer of acrylic acid, an ester or an amide thereof, and that of methacrylic acid, an ester or an amide thereof, a copolymer with another copolymerizable monomer containing 50% or more of a monomer of the acrylic acid or the like; nitrile resins such as a polymer of acrylonitrile and/or methacrylonitrile, a copolymer with another copolymerizable monomer containing 50% or more of a monomer of the acrylonitrile or the like; polyamide resins such as a linear polymer comprising the constituent units of the polymer bonded through repetition of amide linkages, for example, a ring-opened polymer of ε-aminocaprolactam or ω-aminolaurolactam, a polycondensate of ε-aminoundecanoic acid, a polycondensate of hexamethylenediamine with dibasic acids such as adipic acid, sebacic acid, etc.; polyester resins such as a linear polymer comprising the constituent units of the polymer bonded through repetition of ester linkages, for example, condensed product between dibasic acid such as phthalic acid, isophthalic acid or the like or derivatives thereof and a glycolic component such as ethylene glycol, propylene glycol, butylene glycol or the like; a polyphenylene ether resin or a grafted polyphenylene ether resin having a vinyl-substituted aromatic hydrocarbon graft polymerized thereon; polyphenylenesulfide resin; a polyacetal resin such as a copolymer of polyoxymethylene, trioxane and alkylene oxide, etc.; polycarbonate resins such as a linear polymer comprising the constituent units of the polymer bonded through repetition of carbonate ester type linkages, for example, polymers as obtained by a reaction between dihydroxy compound such as 4,4'-dihydroxydiphenylalkane, 4,4'-dihydroxydiphenylsulfide, or the like and phosgene, or polymers as obtained by an ester exchange reaction between the above-described dihydroxy compound and diphenyl carbonate; polysulfone resins such as polyether sulfone, polyaryl sulfone, etc.; thermoplastic polyurethane resins as obtained by polyaddition reaction between a diisocyanate component and a glycol component; polybutadiene resins such as trans-polybutadiene, 1,2-polybutadiene, etc.; polyketone resins; polyarylate resins which are a polycondensation polymer comprising bisphenol A and phthalic acid components; fluorine resins having the structure of a chain hydrocarbon polymeric compound of which a part or all of hydrogens are substituted with fluorine; polyoxybenzoyl resins, polyimide resins; and so on. These thermoplastic resins have number average molecular weights generally more than 1,000, preferably in the range of 5,000 to 5,000,000, more preferably 10,000 to 1,000,000.

Specific examples of suitable polar thermoplastic polymers in the present invention include those as described below.

(1) Polymers containing aliphatic unsaturated carboxylic acids:

The polymer containing an aliphatic unsaturated carboxylic acid to be used in the present invention is a copolymer of an aliphatic unsaturated carboxylic acid with another copolymerizable monomer. Examples of aliphatic unsaturated carboxylic acids may include monocarboxylic acids such as acrylic acid, methacrylic acid, etc., dicarboxylic acids such as fumaric acid, maleic acid, itaconic acid, etc., dicarboxylic anhydrides such as maleic anhydride, itaconic anhydride, etc. Examples of another copolymerizable monomer may include the above-described vinyl aromatic hydrocarbons such as α-methylstyrene, p-methylstyrene, ester derivatives of the above-described aliphatic-unsaturated carboxylic acids with $C_1$–$C_{12}$ alcohols, amidated derivatives, imidated derivatives of aliphatic unsaturated carboxylic acids, nitrile monomers such as acrylonitrile, methacrylonitrile, etc., vinyl acetate, vinyl chloride, vinylidene chloride and others. The weight ratio of the aliphatic unsaturated carboxylic acid to another copolymerizable monomer may be generally 1/99 to 50/50, preferably 3/97 to 40/60. Also, rubber-modified polymers obtained by making natural rubber, butadiene rubber, styrene-butadiene rubber, ethylene-propylene copolymer rubber, ethylene-propylene-diene monomer-copolymer rubber, etc. to co-exist during the polymerization of aliphatic unsaturated carboxylic acids with another copolymerizable monomer can be utilized.

Particularly suitable polymers containing aliphatic unsaturated carboxylic acids may include copolymers comprising 14 to 94% by weight of methyl methacrylate, 5 to 85% by weight of acrylic acid or methacrylic acid and 1 to 70% by weight of a vinyl aromatic hydrocarbon (weight average molecular weight of 50,000 to 500,000, preferably 70,000 to 200,000), copolymers comprising 3 to 50% by weight of acrylic acid or methacrylic acid and 50 to 97% by weight of a vinyl aromatic hydrocarbon (weight average molecular weight of 100,000 to 500,000, preferably 150,000 to 400,000) and copolymers comprising 3 to 45% by weight of maleic anhydride and 97 to 55% by weight of a vinyl aromatic hydrocarbon (weight average molecular weight of 100,000 to 500,000, preferably 150,000 to 400,000).

(2) Polyamide polymers:

The polyamide polymer to be used in the present invention may be a polycondensate of dicarboxylic acid and a diamine, a polycondensate of α-aminocarboxylic acid, a polymer produced by ring-opening polymerization of cyclic lactam, etc., including specifically nylon-46, nylon-6, nylon-66, nylon-610, nylon-11, nylon-12, etc. copolymers thereof, namely nylon-6-nylon-66 copolymer, nylon-6-nylon-12 copolymer etc. The polyamides should preferably have a number average molecular weight of 200 to 50,000, preferably 1,000 to 30,000, having a melting point of 150° to 270 ° C.

(3) Polyester polymers:

The polyester polymer to be used in the present invention is a thermoplastic one. The polyester polymer contains ester linkages in the molecule, and representative ones are polyesters having a structure in which a dicarboxylic acid is polycondensed with a glycol or a bisphenol, and these can be obtained by polycondensation of a dicarboxylic acid or lower ester thereof, acid halide or acid anhydride thereof with a glycol or a bisphenol. Examples of aromatic or aliphatic dicarboxylic acids which are starting materials of the polyester may include oxalic acid, malonic acid, succinic acid, glutaric acid, pimellic acid, suberic acid, adipic acid, sebacic acid, azelaic acid, 1,9-nonane-dicarboxylic acid, 1,10-decanedicarboxylic acid, 1,16-hexadecane-dicarboxylic acid, terephthalic acid, isophthalic acid, p,p'-dicarboxyldiphenyl, p-carboxy-phenoxyacetic acid, 2,6-naphthalene-dicarboxylic acid, etc., and they can be used according to any desired combination. Among them, terephthalic acid and isophthalic acid are particularly preferred.

The glycol (or diol) which is the other starting material for the above-described polyester may include aliphatic or aromatic ones, and examples thereof may include ethylene glycol, 1,3-propane diol, 1,2-propane diol, 1,4-butane diol, 1,6-hexane diol, 1,4-cyclohexane diol, 1,10-decane diol, neopentyl glycol, p-xylene glycol bisphenol A, etc., and they can be used individually or in any desired combination. Among them, an alkylene glycol having 2 to 10 carbon atoms is preferred, particularly ethylene glycol, 1,4-butane diol. Useful of the above polyesters comprising the dicarboxylic acid units and glycolic units are polyethylenephthalate, polybutylenephthalate and those in which a part of these monomer units are replaced with other monomer units.

The polyesters have molecular weights of 500 to 100,000, preferably 5,000 to 50,000.

The method for polymerization of the polyester is not particularly limitative, but polymerization can be conducted in a conventional manner. There is the method in which the above acid component, for example, terephthalic acid, isophthalic acid, an aliphatic dicarboxylic acid or an ester derivative thereof is subjected to direct esterification or ester exchange reaction at the same time or stepwise with at least one of the glycols as described above, followed by polymerization, or subjected to polycondensation with a dicarboxylic acid chloride. In carrying out this method, various conventional catalysts, stabilizers, modifiers and additives customarily used can be used as desired.

As other useful polyesters, there may be also employed cyclic lactones, for example, polylactones obtained by ring opening polymerization of pivalolactone, β-propiolactone, ε-caprolactone, etc.

These polyester polymers have their molecular terminal ends of hydroxyl groups or carboxyl groups, further deactivated by the reaction with monofunctional alcohol or monofunctional carboxylic acid. In the present invention, the polyester polymer should preferably have a functional group at a part or all of the molecular terminal ends which is capable of reacting with the functional group of the modified block copolymer as described above. The polyester containing such functional groups has remarkably improved compatibility of the composition through the reaction of a part thereof with the modified block copolymer.

The above polyester polymer can be used not only as a single type but in combination of two or more types.

The thermoplastic polyester polymer as referred to in the present invention is also inclusive of, low crystalline polyesters having melting points lower than those, and polyether ester block polymers having hard segments and soft segments within the same molecule, in addition to polyesters used for fibers, films, resins, etc., such as polyethyleneterephthalate.

(4) Thermoplastic polyurethane polymer:

The thermoplastic polyurethane polymer to be used in the present invention may be classified into a complete thermoplastic type and an incomplete thermoplastic type depending on the synthetic conditions thereof, and the types are determined by a molar ratio of OH groups of the bifunctional polyol and glycol and NCO groups of the diisocyanate in the starting materials; those synthesized at a ratio of about $0.95 < \text{NCO/OH} \leq 1$ are a complete thermoplastic type, and those synthesized at a ratio of about $1 < \text{NCO/OH} < 1.1$ are an incomplete thermoplastic type. As a thermoplastic polyurethane as described above, there may be included, for example, one comprising a block of a polyol (polyester or polyether) and a diisocyanate as a soft segment and a block of a diisocyanate and a glycol as a hard segment.

Examples of a polyester diol of the above-described starting material may include poly(1,4-butyleneadipate), poly(1,6-hexaneadipate), polycaprolactone, etc., and examples of a polyether diol may include polyethylene glycol, polypropylene glycol, polyoxytetramethylene glycol, etc. Further, a glycol may be exemplified by ethylene glycol, 1,4-butane diol, 1,6-hexane diol, etc., and diisocyanates may include aromatic, alicyclic and aliphatic ones, such as tolylene diisocyanate, 4,4'-diphenylmethane diisocyanate, hexamethylene diisocyanate, isophorone diisocyanate, etc.

Other than the thermoplastic polyurethane elastomers as described above, even a polyurethane polymer used for adhesives, foams, paints, etc. can be also used for the composition of the present invention, if it has sufficient compatibility with the specific hydrogenated block copolymer and/or a modified one thereof which is the component (a) of the present invention.

As a thermoplastic polyurethane, those having molecular weights of 5,000 to 500,000, preferably 10,000 to 300,000 can be favourably employed from the viewpoint of mechanical characteristics.

(5) Vinyl alcohol polymer:

The vinyl alcohol polymer is a polymer composed of vinyl alcohol units or a copolymer comprising vinyl alcohol units, which is a polymer obtained by partial saponification or complete saponification of a vinyl ester polymer by using an alkali. Ethylene-vinyl alcohol copolymer is synthesized from the corresponding ethylene-vinyl acetate copolymer as the starting material, and an ethylene-vinyl acetate copolymer having a vinyl acetate content of 0.5 to 80 mol % is generally used.

The above-described polymer has about 10 to 100 mol % of the vinyl acetate units saponified to be converted to an ethylene vinyl alcohol copolymer. In the present invention, various polyvinyl alcohols or olefin-vinyl alcohol copolymers can be employed, but an ethylene-vinyl alcohol copolymer is preferable in an aspect of processability and mechanical properties.

(6) Polyoxymethylene polymer:

Examples of the polyoxymethylene polymer may include homopolymers produced by polymerization of formaldehyde or trioxane, or copolymers composed mainly of the above-described monomer. It is generally practiced in the art that homopolymers are modified by converting the terminal groups of the polymer into ester groups or ether groups to improve heat resistance or chemical resistance. The copolymer may include copolymers of formaldehyde or trioxane with another aldehyde, a cyclic ether, a cyclic carbonate, an epoxide, an isocyanate, a vinyl compound, etc.

(7) Polycarbonate polymer:

Preferably used as the polycarbonate polymer is an aromatic polycarbonate having structural units of the general formula:

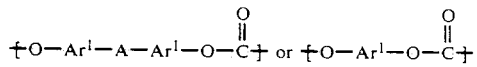

wherein $Ar^1$ represents a phenylene group or a phenylene group substituted with an alkyl, substituted alkyl, alkoxy, halogen or nitro group, A represents an alkylene group, an alkylidene group, a cycloalkylene group, a cycloalkylidene group, sulfur, oxygen, sulfoxide group or sulfone group. A particularly preferable example is poly-4,4'-dioxy-diphenyl-2,2'-propanecarbonate.

(8) Polysulfone polymer:

Preferably used as the polysulfone polymer is a thermoplastic polysulfone having the structural units of the formula:

or

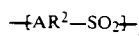

wherein $Ar^2$ represents a phenylene group, and B represents oxygen, sulfur or an aromatic diol residue, a bisphenol residue. Particularly preferable examples may include poly(ether sulfone), poly(4,4-bisphenol ether sulfone), poly(thioether sulfone).

(9) Polphenylene ether polymer:

The polyphenylene ether polymer is a phenylene ether polymer having the structural unit of the formula:

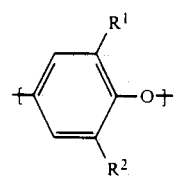

wherein $R^1$, $R^2$ represent $C_1$-$C_4$ alkyl group, substituted alkyl group or halogen; or a grafted polyphenylene ether copolymer having a styrenic compound graft polymerized onto said phenylene ether polymer. The styrenic compound to be used for grafting may include styrene, α-methylstyrene, methylstyrene, tertbutylstyrene, chlorostyrene, etc., and they may be made coexist in two more types, and if desired, other copolymerizable vinyl compounds such as acrylic acid ester, methacrylic acid ester, acrylonitrile, methacrylonitrile can be used in combination for co-graft polymerization. A preferable phenylene ether polymer is poly(2,6-dimethyl-1,4-phenylene)ether, and its preferable graft modified product is a styrene-grafted copolymer of said polymer.

(10) Polyarylenesulfide polymer:

The polyarylenesulfide polymer is an arylene sulfide polymer or copolymer having the structural unit of the general formula:

$$-\!\!\left\{\mathrm{Ar}^3\!\!-\!\!\mathrm{S}\right\}\!\!-$$

wherein $Ar^3$ represents a phenylene group or a phenylene group substituted with an alkyl or substituted alkyl group. Preferable examples may include polyphenylenesulfide, poly-4,4'diphenylenesulfide, etc.

(11) Polyketone resin:

The polyketone resin is a polyether ketone polymer or copolymer having the structural unit of the general formula:

$$-\!\!\left\{\mathrm{Ar}^3\!\!-\!\!\mathrm{O}\!\!-\!\!\mathrm{Ar}^3\!\!-\!\!\mathrm{CO}\!\!-\!\!\mathrm{Ar}^3\!\!-\!\!\mathrm{O}\right\}\!\!-,$$

$$-\!\!\left\{\mathrm{Ar}^3\!\!-\!\!\mathrm{Ar}^3\!\!-\!\!\mathrm{O}\!\!-\!\!\mathrm{Ar}^3\!\!-\!\!\mathrm{CO}\!\!-\!\!\mathrm{Ar}^3\!\!-\!\!\mathrm{O}\right\}\!\!-,$$

or $$-\!\!\left\{\mathrm{Ar}^3\!\!-\!\!\mathrm{D}\!\!-\!\!\mathrm{Ar}^3\!\!-\!\!\mathrm{O}\!\!-\!\!\mathrm{Ar}^3\!\!-\!\!\mathrm{CO}\!\!-\!\!\mathrm{Ar}^3\!\!-\!\!\mathrm{O}\right\}\!\!-$$

wherein $Ar^3$ is the same as defined above, D represents oxygen, sulfur, $-SO_2-$, $-CO-$, an alkylene group, a biphenol group. A preferable example is a polyether ether ketone.

(12) Polyarylate resin:

The polyarylate resin is a polyester resin comprising diphenol, and is produced according to a method in which an acetic acid ester of bisphenol and a carboxylic acid, or bisphenol and a phenol ester of dicarboxylic acid are reacted in a molten state at high temperature, a method in which a dicarboxylic acid dichloride and bisphenol are reacted in an organic solvent in the presence of an amine as an acid eliminating agent, or a method in which a dicarboxylic acid dichloride and bisphenol are dissolved respectively in two types of solvents incompatible with each other, the two liquids are mixed while stirring in the presence of an alkali and a condensation reaction is effected at the interface therebetween. A preferable example is a polycondensate of bisphenol A with phthalic acid component.

(13) Fluorine resin:

The fluorine resin is a polymer having the structure of a chain hydrocarbon polymer of which a part or all of hydrogens are substituted with fluorine. Specific examples may include polytetrafluoroethylene, tetrafluoroethylene-perfluoroalkylvinyl ether copolymer, tetrafluoroethylene-hexafluoropropylene copolymer, polychlorotrifluoroethylene, tetrafluoroethylene-ethylene copolymer, polyvinylidene fluoride, polyvinylfluoride, etc.

(14) Polyoxybenzoyl resin:

The polyoxybenzoyl resin is a polymer having p-oxybenzoic acid as a monomer unit, and can be produced by solution polycondensation or melt polycondensation by using p-hydroxybenzoic acid, terephthalic acid, isophthalic acid, 4,4'-dihydroxy-diphenyl or derivatives thereof. Preferable examples may include homopolymers of p-hydroxybenzoic acid, copolymers of p-hydroxybenzoic acid and terephthalic acid and/or isophthalic acid, 4,4'-dihydroxydiphenyl.

(15) Polyimide resin:

The polyimide resin is a resin having imide linkage in the main chain, including linear polyimides as represented by poly(hydroxydiphenylene-pyromellitimide), and addition hardening type as represented by polyaminobismaleimide. The former is also inclusive of a polyamide imide or polyether imide containing amide linkage or ether linkage in addition to imide linkage. The linear polyamide is obtained by the condensation reaction of an aromatic polyhydric carboxylic anhydride or its derivative with an aromatic diamine, and the addition hardening type polyimide is obtained by the addition reaction of bismaleimide with a diamine or a biscyanate. Preferable examples may include polyimide, polyaminobismaleimide(polybismaleimide), bismaleimide-triazine resin, polyamide imide, polyether imide, etc.

In the present invention, the above-described suitable thermoplastic polymers may be used in combination of two or more kinds.

Also, the above-described suitable thermoplastic polymer can be used in combination with polystyrene type polymers as described above, otherwise polyethylene type polymers, polypropylene type polymers, polybutylene type polymers, polyvinyl chloride type polymers, polyvinyl ester type polymers, polyacrylate type polymers, polyacrylonitrile type polymers, etc.

When the specific hydrogenated block copolymer and the above-described thermoplastic polymer are used in combination in the thermoplastic resin composition of the present invention, the amounts formulated can be varied variously depending upon the desired characteristics of the composition, and the specific hydrogenated block copolymer and the thermoplastic polymer can be used at the weight ratio ranging from 99/1 to 1/99, preferably 95/5 to 5/95. The thermoplastic polymers may be used as a combination of two or more types at any desired ratio.

Specifically, when the specific hydrogenated block copolymer is used as a modifying material for the thermoplastic resin, the weight ratio of the specific hydrogenated block copolymer to the thermoplastic polymer may be generally 2/98 to 50/50, preferably 5/95 to 40/60. On the other hand, when the strength, hardness, etc. of the specific hydrogenated block copolymer are intended to be improved, the weight ratio of the specific hydrogenated block copolymer to the thermoplastic polymer may be generally 40/60 to 97/3, preferably 50/50 to 90/10.

In the thermoplastic resin composition of the present invention, inorganic fillers and/or organic fillers can be formulated. Specific examples of such fillers may include calcium carbonate, clay, silica, zinc white, magnesium carbonate, magnesium silicate, talc, diatomaceous earth, dolomite, mica powder, aluminum sulfate, barium sulfate, graphite, glass fiber, carbon black, a resin having high styrene content, coumarone-indene resin, phenol-formaldehyde resin, modified melamine resin, petroleum resin, lignin, wood powder, carbon fiber, etc. The filler may be employed in an amount of 1 to 200 parts by weight, preferably 10 to 150 parts by weight per 100 parts by weight of the specific hydrogenated block copolymer (a).

Also, in the thermoplastic resin composition of the present invention, a softener can be formulated. Specific examples thereof may include lubricant oils, paraffinic process oils, naphthenic process oils, aromatic process oils, paraffin, petrolatum, asphalt, fatty oils softener (castor oil, cottonseed oil, rapeseed oil, soybean oil, etc.), sub, rosin, fatty acid, etc., the softener may be employed in an amount of not higher than 200 parts by weight, generally 20 to 100 parts by weight, preferably 40 to 80 parts by weight per 100 parts by weight of the specific hydrogenated block copolymer (a).

Further, in the thermoplastic resin composition of the present invention, crosslinking agents such as organic peroxides, inorganic peroxides, etc., pigments such as titanium white, carbon black, iron oxide, flame retardants, antioxidants, UV-ray absorbers, antiblocking agents, antistatic agents, lubricants, plasticizers and extenders or mixtures thereof can be formulated. Specifically, the compounds as described in "Practical Handbook of Additives for Plastics and Rubbers" (Kagaku Kogyo Co.) can be used as the additives.

When the thermoplastic resin composition of the present invention is to be used as the base material for shoe sole, it is possible to utilize a composition comprising 5 to 150 parts by weight, preferably 10 to 100 parts by weight of a thermoplastic resin, 10 to 200 parts by weight, preferably 20 to 150 parts by weight of an inorganic filler and/or an organic filler, 0 or not more than 200 parts by weight, namely 0 to 200 parts by weight, preferably 20 to 100 parts by weight of a softener formulated per 100 parts by weight of the specific hydrogenated block copolymer as defined in the present invention, as one which is suitable.

In the present invention, the thermoplastic resin composition can be prepared according to various types of conventionally known formulation methods. For example, there may be employed melting and kneading methods using kneading machines in general such as an open roll, an intensive mixer, an internal mixer, a cokneader, a continuous mixing machines equipped with biaxial rotars, an extruder, etc., methods in which the respective components are mixed by dissolving or dispersing in a solvent, followed by removal of the solvent by heating. The kneading temperature in the melting and kneading method can be selected variously depending upon the characteristics of the thermoplastic resin employed, but may be generally 120° to 350 ° C., preferably 150 to 300 ° C.

As a bituminous material of component (b) to be used in the bituminous composition of the present invention, there may be included by-products during petroleum refining such as petroleum asphalt or those obtained as a natural product such as natural asphalt, or mixtures thereof with petroleums, of which the main component is called bitumen. As specific examples, straight asphalt, semi-blown asphalt, blown asphalt, tar, pitch, cutback asphalt added with oil, asphalt emulsion, etc., can be used. They can be used as a mixture.

The preferable bituminous material in the present invention is a straight asphalt having penetration of 30 to 130, more preferably 45 to 120. By use of the material with penetration in this range, a composition having excellent softening point, elongation and strength properties can be obtained.

The weight ratio of component (a) to component (b) in the bituminous composition in the present invention may be 99/1 to 1/99, preferably 97/3 to 3/97, more preferably 95/5 to 5/95. In the bituminous composition of the present invention, when improvement of the bituminous material is intended, it is recommendable to formulate about 1 to 500 parts by weight, preferably about 3 to 100 parts by weight, more preferably about 5 to 70 parts by weight of component (a) per 100 parts by weight of the bituminous material of component (b). On the other hand, when improvement of the characteristics of component (a) is intended, it is recommended to formulate about 1 to less than 20 parts by weight, preferably about 3 to 15 parts by weight of component (b) per 100 parts by weight of the specific hydrogenated block copolymer of component (a).

In the bituminous composition of the present invention, any desired additive can be formulated in any desired amount, if necessary. Types of the additives may include inorganic fillers such as clay, talc, calcium carbonate, zinc oxide, glass beads, etc.; aggregates such as crushed stone, gravels, sand, etc.; fibrous reinforcing materials such as glass fiber, asbestos, etc.; organic reinforcing agents such as carbon black; tackifier resins such as coumarone-indene resin, terpene resin, etc.; softeners such as parrafinic, naphthenic and aromatic oils; thermoplastic resins such as polyolefin resin, polystyrene resin, polyvinyl chloride resin, etc.; natural rubbers, synthetic rubbers such as polybutadiene rubber, a styrene-butadiene rubber, a nitrile rubber, etc.; and the like.

In the bituminous composition of the present invention, a mixing of component (a) and component (b) or other additives, etc. can be practiced according to various methods which are not particularly limitative, and however the following method is simple. That is, the bituminous material is melted by heating, and component (a), etc., is added thereinto in a predetermined amount, followed by mixing with stirring, or alternatively, the bituminous material and component (a), etc., can be kneaded by a Bumbury mixer or an open roll mill to prepare a masterbatch, which is then added and mixed into the bituminous material melted by heating to prepare the mixture. Also, the bituminous material and component (a), etc., may be added and mixed into a heating style kneader to prepare the mixture. In these methods, the kneading temperature may be generally 120° to 250 ° C., preferably 150° to 220 ° C. Component (a) may be preferably used in a form of crumbs, pellets or powder.

In the block copolymer composition of the present invention, particularly the adhesive composition, for the purpose of further improving the treatment performance at high temperature, it is possible to add at least one stabilizer selected from phenolic stabilizers, phosphorus-containing stabilizers, sulfur-containing stabilizers or amine-group-containing stabilizers. The stabilizers may each be added in an amount generally of 0.01 to 5 parts by weight, preferably 0.05 to 3 parts by weight based on 100 parts by weight of the specific hydrogenated block copolymer of component (a).

Preferable phenolic stabilizers may include at least one stabilizer selected from the following formulae [I]-[VII].

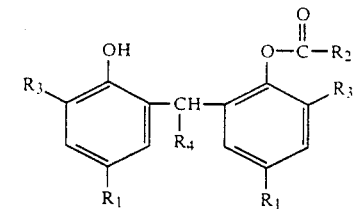
[I]

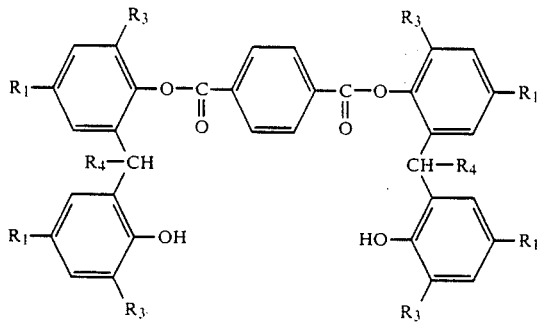
[II]

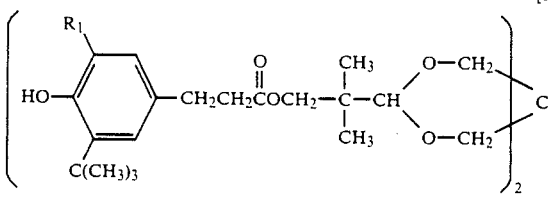
[III]

wherein, $R_1$ represents an alkyl group having 1 to 4 carbon atoms, $R_2$ an alkenyl group having 2 to 4 carbon atoms, $R_3$ a tert-butyl group or a cyclohexyl group, $R_4$ hydrogen or an alkyl group having 1 to 18 carbon atoms.

Specific examples of the above-described substituent $R_1$ may include methyl, ethyl, propyl, isobutyl, tert-butyl groups, particularly preferably methyl or tert-butyl group. $R_2$ is an alkenyl having 2 to 4 carbon atoms, specifically ethenyl, isopropenyl, propenyl, isobutenyl, butenyl groups, particularly preferred is ethenyl group. Preferable as $R_3$ is tert-butyl group. Specific examples of the substituent $R_4$ may include hydrogen, methyl, ethyl, propyl, butyl group, particularly preferably hydrogen or methyl group,

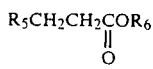
[IV]

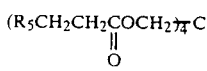
[V]

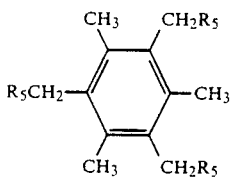
[VI]

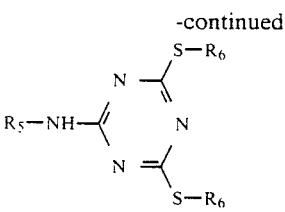
[VII]

-continued wherein $R_5$ represents

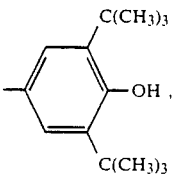

$R_6$ an alkyl group having 2 to 22, preferably 4 to 20 carbon atoms. Particularly, in formula, $R_6$ is preferably an octadecyl group, while in formula, $R_6$ is preferably an octyl group.

Specific examples of phosphorus-containing stabilizers may include tris(nonylphenyl)phosphite, cyclic neopentanetetraylbis-(octadecylphosphite), tris(2,4-di-tert-butylphenyl)phosphite, 4,4-butylidene-bis(3-methyl-6-tertbutylphenyl-di-tridecyl)-phosphite, 4,4'-biphenylenediphosphinic acid tetrakis(2,4-di-tert-butyl-phenyl), cyclic neopentanetetraylbis(2,4-di-tert-butyl-phenyl)phosphite, etc.

Specific examples of sulfur-containing stabilizers may include dilauryl-3,3'-thiodipropionic acid ester, dimyristyl3,3'-thiodipropionic acid ester, distearyl-3,3'-thiodipropionic acid ester, laurylstearyl-3,3'-thiodipropionic acid ester, ditridecyl-3,3'-thiodipropionic acid ester or the compounds represented by formulae [VIII], [IX]

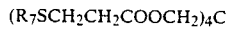
[VIII]

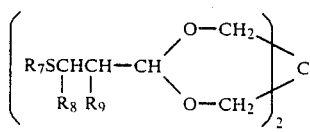
[IX]

wherein $R_7$ represents an alkyl group having 3 to 20 carbon atoms, specifically hexyl, octyl, dodecyl, octadecyl group, etc., particularly preferable is an dodecyl group, $R_8$ and $R_9$ each represent hydrogen atom or an alkyl group having 1 to 18 carbon atoms, particularly preferable are hydrogen and a methyl, ethyl, propyl and butyl groups. Specific examples of the compounds represented by the formulae [VIII]or [IX]may include pentaerythritol-tetrakis-(laurylthiopropionate), 3,9-bis(2-dodecylthioethyl)-2,4,8,10-tetraoxaspiro[5,5]undecane, 3,9-bis(2-octadecylthiopropyl)-2,4,8,10-tetraoxaspiro[5,5]undecane.

Among the block copolymer compositions of the present invention, the adhesive composition is excellent in initial tackiness, adhesive strength, creep resistance and treatment performance at high temperature, and, being characterized with these specific features, the adhesive composition can be utilized for various adhesive tapes, labels, pressure-sensitive adhesive thin plates, pressure-sensitive adhesive sheets, back paste for fixing various light-weight plastics molding, back paste for fixing carpets, back paste for fixing tiles, and is particularly effective for adhesive tapes and labels. Also, the adhesive composition of the present invention can be used as an adhesive for plastic, rubbery materials, foams, metals, woods, paper products, etc.

Among the block copolymer compositions of the present invention, the thermoplastic resin composition having excellent impact resistance, compatibility, moldability at high temperature and low temperature characteristics can be utilized for various application in which having such characteristics is desirable. The thermoplastic resin composition of the present invention can be processed by molding such as extrusion molding, injection molding, blow molding, etc. into a sheet, a film, a foamed product and various forms of a injection molded product, a blow molded product, a pressure foaming product, a vacuum molded product, etc. Such can be used for food packages and containers, domestic electrical articles, automobile parts, industrial articles, toys, etc Also, these compositions can be utilized for footwares such as various shoes, sandals, etc.

Among the block copolymer compositions of the present invention, the bituminous composition can be utilized for applications in which having excellent balanced characteristics such as a softening point, penetration and strength, as well as excellent low temperature properties, heat aging resistance are desirable. That is, by adopting a suitable amount of component (a) in the composition, it can be utilized for practically all uses for which a bituminous material can be used, such as for road pavement, water-proof, rust prevention, coating of automobile base, for roofing, for pipe coating, for a joint, etc., and in the respective uses, it can contribute to an improvement of temperature-sensitive performance, in resistance to plastic deformation, in impact resistance and in durability.

EXAMPLES

The present invention is described in more detail by referring to the following Examples, but these Examples are set forth for showing the excellent effects obtained by the present invention and not intended to limit the scope of the present invention.

Examples 1-3 and Comparative Examples 1-6

Under nitrogen gas atmosphere, to a cyclohexane solution (a monomer concentration of 20 wt%) containing 10 parts by weight of styrene, n-butyllithium and tetramethylethylenediamine as a polar compound were added and polymerization was carried out at 60 20 C. for one hour, and then a cyclohexane solution containing 80 parts by weight of butadiene was added, followed by polymerization at 60° C. for 2 hours. Then, a cyclohexane solution containing 10 parts by weight of styrene was added and polymerization was carried out at 60° C. for one hour. The amount of tetramethylethylenediamine added was varied so that the vinyl linkage content prior to hydrogenation of the butadiene portion in the block copolymer obtained became the value as shown in Table 1, and the amount of n-butyllithium added was controlled so that the specific hydrogenated copolymer finally obtained had a melt flow of about 10 g/10 min. (temperature 200° C., load 5 kg, JIS K6870).

Next, the block copolymer as obtained above was hydrogenated with a Ti system hydrogenation catalyst composed of bis(cyclopentadienyl)titanium dichloride-alkyllithium as disclosed in U.S. Pat. No 4,501,857 to obtain a specific hydrogenated block copolymer having the hydrogenated ratio [A]of the whole of butadiene portion and the hydrogenated ratio [B]of the vinyl linkage portion as shown in Table 1. To 100 parts by weight of the specific hydrogenated block copolymer were added 1.0 part by weight of a phenolic stabilizer of the abovedescribed formula [IV] in which $R_6$ is octadecyl group (hereinafter abbreviated as "AO-1") and 0.5 part by weight of tris(nonylphenyl)-phosphite. The hydrogenated ratio was measured by using a nuclear magnetic resonance device.

Next, a hot melt adhesive composition was prepared by formulating 100 parts by weight of a tackifier (YS-resin TO-105, produced by Yasuhara Yushi) and 30 parts by weight of a naphthenic process oil (Sonic Process Oil R-200, produced by Kyodo Sekiyu) with 100 parts by weight of each specific hydrogenated block copolymer.

The adhesive composition thus prepared was applied on a kraft paper subjected to back treatment to prepare a kraft adhesive tape, and the following performance evaluation was conducted. The initial tackiness was measured according to the J. Dow method [Proc Inst. Rub. Ind., 1,105 (1954)]by plastering an adhesive tape of 10 cm in length to a slope on a stainless-steel plate slanted at an angle of 30 degrees, making balls made of stainless steel having 32 kinds of sizes from ⅓ inch to 1 inch in diameter roll down at a initial speed of 0 from a position on the slope at 10 cm above the upper end of the tape and represented by the size of a ball having the maximum diameter among balls which stopped on the adhesive tape. The adhesive strength was measured according to JIS Z-1522 by plastering a adhesive tape having 25 mm width × 100 mm length on a stainless-steel plate, and peeling off the tape at 2320 C. at a speed of 300 mm/min. in the direction of 180°. The creep resistance was measured according to JIS Z-1524 by plastering an adhesive tape in contact with a stainless steel plate at an area of 25 mm × 25 mm, and measuring the time before the adhesive tape is slipped off under application of a load of 1 kg at 60° C.

The treatment performance at high temperature was examined by preparing a kraft adhesive tape according to the same method as above after heating in air the above-described hot melt adhesive composition at 200° C. for 48 hours, and measuring its adhesive characteristic.

The results are shown in Table 1, and it can be seen that the adhesive compositions within the range defined by the present invention exhibit good initial tackiness, adhesive strength, creep resistance and treatment performance at high temperature.

TABLE 1

| | Specific hydrogenated block copolymer, etc. | | | | | | Adhesive properties | | | Treatment performance at high temperature | |
|---|---|---|---|---|---|---|---|---|---|---|---|
| | Polymer structure | Styrene content (wt %) | Vinyl linkage content [V] (%) | Hydrogenated ratio [A] (%) | Hydrogenated ratio [B] (%) | [B]/[V]½ | Ball tack (No.) | Adhesive strength (g/cm) | Creep resistance (min.) | Ball tack (No.) | Creep resistance (min.) |
| Example | | | | | | | | | | | |
| 1 | ABA | 20 | 35 | 17 | 50 | 8.5 | 23 | 850 | 200 | 22 | 175 |

TABLE 1-continued

| | Specific hydrogenated block copolymer, etc. | | | | | | Adhesive properties | | | Treatment performance at high temperature | |
|---|---|---|---|---|---|---|---|---|---|---|---|
| | Polymer structure | Styrene content (wt %) | Vinyl linkage content [V] (%) | Hydrogenated ratio [A] (%) | Hydrogenated ratio [B] (%) | $\frac{[B]}{[V]^{\frac{1}{2}}}$ | Ball tack (No.) | Adhesive strength (g/cm) | Creep resistance (min.) | Ball tack (No.) | Creep resistance (min.) |
| 2 | | | | 30 | 65 | 11.0 | 24 | 870 | 275 | 24 | 255 |
| 3 | | | | 45 | 80 | 13.5 | 23 | 830 | 360 | 23 | 350 |
| Comp. Ex. | | | | | | | | | | | |
| 1 | | | | 0 | 0 | 0 | 21 | 810 | 165 | 14 | 80 |
| 2 | | | | 3 | 12 | 2.0 | 21 | 810 | 165 | 15 | 95 |
| 3 | | | | 85 | 94 | 15.9 | <10 | 710 | >1000 | <10 | >1000 |
| 4 | | | | 100 | 100 | 22.4 | <10 | 750 | >1000 | <10 | >1000 |
| 5 | | | 8 | 30 | 85 | 30.1 | 15 | 730 | 150 | 14 | 130 |
| 6 | | | 83 | 30 | 38 | 4.2 | <10 | 790 | 950 | <10 | 950 |

Examples 4 and 5

Adhesive compositions were prepared according to the same method as in Example 2 except for changing the amounts of the tackifiers and softeners formulated as shown in Table 2 and using 0.5 part by weight of a phenolic compound of the above-described formula [I]wherein $R_1$ is methyl group, $R_2$ is ethenyl group, $R_3$ is tert-butyl group and $R_4$ is hydrogen (hereinafter abbreviated as "AO-2") and 0.5 part by weight of tris(2,4-di-tert-butyl-phenyl)phosphite based on 100 parts by weight of the specific hydrogenated block copolymer, and their performances were evaluated. The results were shown in Table 2. Further, the adhesive compositions of Examples 4-I and 4-II were found to have the same initial tackiness and creep resistance as before heating even after heating at 200° C. for 48 hours.

TABLE 2

| Examples | Amount of tackifier formulated (wt. parts) | Amount of softener formulated (wt. parts) | Ball tack (No.) | Adhesive strength (g/cm) | Creep resistance (min.) |
|---|---|---|---|---|---|
| 4-I | 150 | 60 | 26 | 750 | 170 |
| 4-II | 70 | 20 | 19 | 910 | 300 |
| 5-I | 250 | 30 | <10 | Kraft paper broken | <60 |
| 5-II | 10 | 30 | <10 | <300 | <60 |

Examples 6, 7 and Comparative Examples 7 and 8

Based on 100 parts by weight of the specific hydrogenated block copolymers shown in Table 3, 100 parts by weight of the tackifiers shown in Table 3, 30 parts by weight of a softener (Sonic Process Oil R-200), 0.5 part by weight of AO-1, 0.5 part by weight of AO-2 and 0.5 part by weight of a sulfur-containing stabilizer of the above-described formula [VIII]wherein $R_7$ is dodecyl group were formulated to prepare adhesive compositions, and their performances were evaluated. The results were shown in Table 3.

The adhesive compositions of Examples 6 and 7 were found to have the same initial tackiness and creep resistance as before heating even after heating at 200° C. for 48 hours.

TABLE 3

| | Specific hydrogenated block copolymer, etc. | | | | | | | Adhesive properties | | |
|---|---|---|---|---|---|---|---|---|---|---|
| | Polymer structure | Styrene content (wt %) | Vinyl linkage content [V] (%) | Hydrogenated ratio [A] (%) | Hydrogenated ratio [B] (%) | $\frac{[B]}{[V]^{\frac{1}{2}}}$ | Kind of tackifier used | Ball tack (No.) | Adhesive strength (g/cm) | Creep resistance (min.) |
| Ex. 6 | (Note 1) | 40 | 20 | 25 | 60 | 13.4 | Alicyclic saturated petroleum resin (Note 2) | 17 | 790 | 495 |
| Comp. Ex. 7 | BABA | | | 60 | 95 | 21.2 | | <10 | 700 | 350 |
| Ex. 7 | (A-B)$_4$Si | 30 | 55 | 40 | 65 | 8.8 | Modified aliphatic petroleum resin (Note 3) | 19 | 750 | 370 |
| Comp. Ex. 8 | | | | 8 | 17 | 2.3 | | 11 | 690 | 250 |

Note 1: Block styrene content of block copolymer before hydrogenation determined by the oxidative decomposition method by using osmium tetraoxide (L. M. Kolthoff, et al., J. Polym. Sci. 1, 429 (1946)) was about 28 wt %, with a part of styrene randomly copolymerized in a taper in the B segment.
Note 2: Alcon M-90 (produced by Arakawa Kagaku) was used.
Note 3: ECR 316 (produced by Exxon Chemical) was used.

Example 8 and Comparative Examples 9 and 10

A adhesive composition was prepared by formulating 100 parts by weight of a specific hydrogenated block copolymer of a styrene-isoprene block copolymer, having ABA structure, a styrene content of 15% by weight, a block styrene content of 10% by weight, a vinyl linkage content prior to hydrogenation (total amount of 1,2-linkage and 3,4-linkage) of 15%, a melt flow of about 5 g/10 min. and two tapered random copolymer portions in the B segment with 100 parts by weight of a tackifier (Quinton U-185, produced by Nippon Zeon), 30 parts by weight of a softener (Sonic Process Oil R-200), 0.5 part by weight of a phenolic stabilizer of the above-described formula [V], 0.5 part by weight of a phenolic stabilizer of the above-described formula [VII]wherein $R_6$ is octyl group and 1.0 part by weight of a sulfur-containing stabilizer of the above-described formula [IX]wherein $R_7$ is dodecyl group, $R_8$ and $R_9$ are hydrogen atoms, and its performance was evaluated. The results were shown in Table 4. The adhesive composition of Example 8 was found to be a composition having excellent treatment performances at high temperature, having the same performances as before the heat treatment after the treatment at 200° C. for 12 hours.

TABLE 4

| | Hydrogenation condition | | | | | |
|---|---|---|---|---|---|---|
| | Hydrogenated ratio [A] (%) | Hydrogenated ratio [B] (%) | [B]/[V]$^{\frac{1}{2}}$ | Ball tack (No.) | Adhesive strength (g/cm) | Creep resistance (min.) |
| Example 8 | 15 | 60 | 15.5 | 24 | 730 | 155 |
| Comp. Ex. 9 | 0 | 0 | 0 | 21 | 690 | 65 |
| Comp. Ex. 10 | 100 | 100 | 25.8 | <10 | 750 | >1000 |

Example 9

In cyclohexane, before deactivating the block copolymer having the same polymer structure, styrene content and vinyl linkage content as in Example 2 polymerized by using n-butyllithium as a catalyst, it was made react with 4,4'-bis diethylamino)benzophenone in an equimolar amount to that of n-butyllithium used to prepare a terminal modified block copolymer having the reaction residue of said compound bound to the terminal end of the polymer chain. Then, a hydrogenation reaction was conducted according to the same method as described above to obtain a specific hydrogenated block copolymer having the same levels of hydrogenated ratio [A] and the hydrogenated ratio [B] as in Example 2.

Next, an adhesive composition was prepared in the same manner as in Example 2 except for using said specific hydrogenated block copolymer as the specific hydrogenated block copolymer, and its performances were evaluated. As a result, the ball tack was 24, the adhesive strength 880 g/cm and the creep resistance 355 min. Thus, an improvement of the creep resistance as compared with Example 2 was recognized.

Example 10

0.5% by weight of maleic anhydride was grafted to the same specific hydrogenated block copolymer as used in Example 2 according to the method as described in U.S. Pat. No. 4,292,414 to obtain a modified block copolymer in which 0.2% by weight of unreacted maleic anhydride existed as mixed therein.

Next, an adhesive composition was prepared according to the same method as in Example 2 except for using said modified block copolymer as the specific hydrogenated block copolymer, and its performances was evaluated. As a result, the ball tack was 24, the adhesive strength 950 g/cm and the creep resistance 480 min. Thus, an improvement was recognized in adhesive strength and creep resistance as compared with Example 2.

Examples 11-13 and Comparative Examples 11-14

Thermoplastic resin compositions were prepared by using the same specific hydrogenated block copolymers as in Example 1 to 3.

60 Parts by weight of a polyphenylene ether (PPE) (an intrinsic viscosity of 0.6, measured at 2520 C. by using a dichloromethane solution), 25 parts by weight of a polystyrene (PS) and 15 parts by weight of a specific hydrogenated block copolymer were melted and kneaded by an extruder at 290° C. to prepare pellets. Then, the pellets were injection molded at 310° C. to obtain test pieces.

The results of measurement of the physical properties of the respective compositions are shown in Table 5, from which it can be seen that the compositions formulated with the specific hydrogenated block copolymers have excellent impact strength, compatibility and heat aging resistance. The compositions of Examples 11-13 were found to have an Izod impact value retentivity (impact value retentivity when the impact value at 23° C. is made 100%) of about 38% at −20° C. On the contrary, the compositions of Comparative Examples 13 and 14 were found to have an Izod impact value retentivity of about 18%. Thus, the compositions of the present invention were superior in low temperature properties

TABLE 5

| | Specific hydrogenated block copolymer, etc. | | | | | | Physical properties of composition | | |
|---|---|---|---|---|---|---|---|---|---|
| | Polymer structure | Styrene content (wt %) | Vinyl linkage content [V] (%) | Hydrogenated ratio [A] (%) | Hydrogenated ratio [B] (%) | [B]/[V]$^{\frac{1}{2}}$ | Izod impact strength (Note 4) (Kg-cm/cm) (notched) | Compatibility (Note 5) | Heat aging resistance (Note 6) |
| Ex. 11 | ABA | 20 | 35 | 17 | 50 | 8.5 | 22.5 | G | G |
| Ex. 12 | | | | 30 | 65 | 11.0 | 29.4 | G | E |
| Ex. 13 | | | | 45 | 80 | 13.5 | 34.2 | G | E |
| Comp. Ex. 11 | | | | 0 | 0 | 0 | 8.3 | G | W |
| Comp. Ex. 12 | | | | 3 | 12 | 2.0 | 9.0 | G | W |
| Comp. Ex. 13 | | | | 85 | 94 | 15.9 | Poor compatibility, also a layered peeling phenomenon observed and no good test piece obtained. | | |
| Comp. Ex. 14 | | | | 100 | 100 | 22.4 | | | |

Note 4: according to JIS K7110; measured at 23° C.
Note 5: judged by observation of the appearance of the test piece and the state of the surface broken by bending.
G: the surface exhibited a uniform tone, with no layered peeling observed at the broken surface;
W: the surface exhibited an irregular tone, with a layered peeling recognized at the broken surface.
Note 6: during an injection molding, the composition was made to reside in a cylinder of an injection molding machine for 20 minutes, and then injection molding was recommenced, and the retentivity in terms of the Izod impact strength of the third shot test piece after recommencement divided by the Izod impact strength of a normal product was evaluated as a heat aging resistance.
E: over 50% of retentivity
G: 30 to 50% of retentivity
W: less than 30% of retentivity.

Comparative Example 15

The same type of the block copolymer as used in Examples 11 to 13 except that a vinyl linkage content before hydrogenation was 83% were hydrogenated according to the same method as described above to obtain a specific hydrogenated block copolymer having a hydrogenated ratio [A]of the whole of butadiene portion of 30%, a hydrogenated ratio [B]at the vinyl linkage portion of 38%.

By using the block copolymer as obtained above, the same composition as in Examples 11 to 13 were obtained. Said composition, though having good compatibility and heat aging resistance, was found to have a retentivity of Izod impact strength at −20° C. of 15%, thus being inferior in low temperature properties.

block copolymer having BSBS structure having a styrene content of 40% by weight and a vinyl linkage content before hydrogenation of 20% according to the same method as described in Examples 1 to 3, and thermoplastic resins were prepared as shown in Table 7, and their physical properties were measured. The results were shown in Table 7.

In Comparative examples, the unhydrogenated block copolymer was employed.

TABLE 7

|  |  | Thermoplastic polymer |  | Block copolymer formulated (parts by weight) | Izod impact strength (Kg-cm/cm notched) | Heat aging resistance |
|---|---|---|---|---|---|---|
|  |  | Type | Amount formulated (parts by weight) |  |  |  |
| Ex. 17 Comp. Ex. 19 |  | High density polyethylene (HDPE) | 85 | 15 | 10.8 9.2 | G W |
| Ex. 18 Comp. Ex. 20 |  | Polypropylene (PP) | 95 | 5 | 6.7 5.5 | G W |
| Ex. 19 Comp. Ex. 21 |  | HIPS | 85 | 15 | 11.3 9.5 | G W |
| Ex. 20 Comp. Ex. 22 |  | ABS | 95 | 5 | 27.0 23.4 | G W |
| Ex. 21 Comp. Ex. 23 |  | Styrene-maleic anhydride copolymer | 85 | 15 | 6.7 5.1 | G W |
| Ex. 22 Comp. Ex. 24 |  | Methyl methacrylate polymer | 75 | 25 | 4.0 3.2 | G W |
| Ex. 23 Comp. Ex. 25 |  | PC | 70 | 30 | 26.5 23.1 | G W |

Examples 14–16 and Comparative examples 16–18

The compositions formulated with t specific hydrogenated block copolymers and the thermoplastic resins shown in Table 6 were prepared, and their physical properties were measured. The results were shown in Table 6.

Examples 24–28 and Comparative Examples 26–30

Under a nitrogen gas atmosphere, 0.08 part by weight of n-butyllithium and 1.5 parts by weight of tetrahydrofuran as a polar compound were added into a cyclohexane solution containing 30 parts by weight of styrene, and after polymerization at 70° C. for 1 hour, further a cyclohexane solution containing 25 parts by weight of

TABLE 6

|  | Specific hydrogenated block copolymer, etc. |  |  |  |  |  | Composition (parts by weight) (Note 7) |  |  |  |  |  | Izod Impact strength (kg-cm/cm) (notched) | Com- pati- bility | Heat aging resist- ance |
|---|---|---|---|---|---|---|---|---|---|---|---|---|---|---|---|
|  | Polymer structure | Sty- rene content (wt %) | Vinyl linkage content [V] (%) | Hydro- genated ratio [A] (%) | Hydro- genated ratio [B] (%) | $\frac{[B]}{[V]}$ | Block copoly- mer of left col. | PC | PSF | PPS | ABS | HIPS |  |  |  |
| Ex. 14 | (A-B)$_4$Si | 30 | 55 | 40 | 65 | 8.8 | 10 | 70 |  |  | 20 |  | 37.3 | G | E |
| Ex. 15 |  |  |  |  |  |  | 20 |  | 60 |  |  | 20 | 15.7 | G | E |
| Ex. 16 |  |  |  |  |  |  | 15 |  |  | 65 | 20 |  | 13.8 | G | E |
| Comp. Ex. 16 |  |  |  | 8 | 17 | 2.3 | 10 | 70 |  |  | 20 |  | 31.5 | G | W |
| Comp. Ex. 17 |  |  |  |  |  |  | 20 |  | 60 |  |  | 20 | 11.1 | G | W |
| Comp. Ex. 18 |  |  |  |  |  |  | 15 |  |  | 65 | 20 |  | 9.4 | G | W |

Note 7:
PC: Polycarbonate
PSF: Polysulfone
PPS: Polyphenylenesulfide
ABS: Acrylonitrile-butadiene-styrene copolymer
HIPS: Rubber-modified impact resistant polystyrene Examples 17–23 and Comparative Examples 19–25

Compositions formulated with a specific hydrogenated block copolymer having a hydrogenated ratio [A]of the whole of butadiene portion of 25% and a hydrogenated ratio [B]of the vinyl linkage portion of 60%, which were produced by hydrogenation of a 1,3-butadiene and 45 parts by weight of styrene was added thereinto, followed by polymerization at 70° C. for 2 hours. The block copolymer obtained was found to contain 75% by weight of styrene and 25% of a vinyl linkage content in the butadiene portion.

Next, the block copolymer as prepared above was hydrogenated according to the same method as described in Examples 1 to 3 to obtain a specific hydrogenated block copolymer having a hydrogenated ratio [A] of the whole of butadiene portion of 32% and a hydrogenated ratio [B] of the vinyl linkage portion of 70%. To 100 parts by weight of the specific hydrogenated block copolymer as obtained were added each 0.5 part by weight of octadecyl-3-(3,5-di-tert-butyl4-hydroxyphenyl)propionate and tris(2,4-di-tert-butyl-phenyl)phosphite, and thereafter the solvent was removed by evaporation.

Next, according to the formulation shown in Table 8, compositions comprising the above-described specific hydrogenated block copolymer and thermoplastic resins were prepared, and their physical properties were measured. The results were shown in Table 8.

In Comparative Examples, the above-described block copolymer before hydrogenated was used as the block copolymer.

equal molar amount to that of the n-butyllithium employed, to obtain terminal modified block copolymers having a styrene content of 40% by weight and a vinyl linkage content of the butadiene portion of 17%.

Next, the terminal modified block copolymers obtained above were hydrogenated with the rhodium system hydrogenation catalyst composed of rhodium triphenylphosphine complex as disclosed in U.S. Pat. No. 3,993,855 to obtain the specific hydrogenated terminal modified block copolymers, each having a hydrogenated ratio [A] of the whole of butadiene portion of 15%, a hydrogenated ratio [B] of the vinyl linkage portion of 65%. To 100 parts by weight of these polymers were added each 0.5 part by weight of 2-tert-butyl-6-(3-tert-butyl-2-hydroxy-5-methyl-benzyl)-4-methyl-phenylacrylate and tris(2,4-di-tert-butyl-phenyl)-phosphite, butyl-phenyl)-phosphite, and then the solvent was evaporated by heating.

Next, 25 parts by weight of the above specific hydrogenated terminal modified copolymers and 75 parts by

TABLE 8

| | Thermoplastic polymer | | Block copolymer formulated (parts by weight) | Izod impact strength (Kg-cm/cm notched) | Heat aging resistance |
|---|---|---|---|---|---|
| | Type | Amount formulated (parts by weight) | | | |
| Ex. 24 | PC | 80 | 20 | 26.3 | E |
| Comp. Ex. 26 | | | | 23.0 | W |
| Ex. 25 | Acrylonitrile-methacrylic acid copolymer (acrylonitrile 75 wt. %) | 10 | 90 | 2.5 | E |
| Comp. Ex. 27 | | | | 1.8 | W |
| Ex. 26 | Methyl methacrylate-styrene copolymer | 15 | 85 | 4.6 | E |
| Comp. Ex. 28 | | | | 3.5 | W |
| Ex. 27 | Methyl methacrylate-acrylonitrile-styrene copolymer | 15 | 85 | 4.3 | E |
| Comp. Ex. 29 | | | | 3.0 | W |
| Ex. 28 | PP | 85 | 15 | 11.3 | E |
| Comp. Ex. 30 | | | | 9.6 | W |

Examples 29–34 and Comparative Example 31

Under a nitrogen gas atmosphere, 0.11 part by weight of n-butyllithium and 0.2 part by weight of tetrahydrofuran were added into a cyclohexane solution containing 15 parts by weight of 1,3-butadiene and 20 parts by weight of styrene, and after polymerization at 70° C. for 2 hours, further a cyclohexane solution containing 45 parts by weight of 1,3-butadiene and 20 parts by weight of styrene was added to carry out polymerization at 7020 C. for 2 hours. The active terminal ends of the polymer obtained were made react respectively with the terminal treating agents shown in Table 9 in an weight of a methyl methacrylate/styrene/methacrylic acid copolymer (respective constituent monomer weight ratio: 65/15/20, weight average molecular weight: about 100,000) were melted and kneaded to be molded into test pieces. The results of evaluation of performances of the respective compositions were shown in Table 9.

In this connection, the block copolymer used in Comparative Example 31 was one having hydrogen atom bonded to the terminal end by treatment of the above-described block copolymer having lithium at the terminal end with methanol, and was not hydrogenated.

TABLE 9

| | | | Physical properties of composition | | |
|---|---|---|---|---|---|
| | | Terminal treating agent (notched) | Izod impact strength (Notched) (Kg-cm/cm) | (Note 8) Tensile strength (Kg/cm$^2$) | (Note 8) Elongation (%) |
| Ex. | 29 | 1,3-dimethyl-2-imidazolidinone | 3.5 | 440 | 55 |
| | 30 | N,N'-dimethylpropylene urea | 3.1 | 440 | 50 |
| | 31 | N-methyl- -caprolactam | 2.9 | 445 | 45 |
| | 32 | Epoxidized soybean oil | 2.7 | 450 | 30 |
| | 33 | Benzaldehyde | 2.5 | 450 | 30 |
| | 34 | ε-Caprolactone | 2.3 | 455 | 30 |
| Comp. Ex. | 31 | Methanol | 1.0 | 485 | 10 |

Note 8: According to JIS K6871

Examples 35-37 and Comparative Examples 32-34

A block copolymer of SIS structure having lithium bound at one terminal end of the polymer, containing 15% by weight of styrene and 15% of the vinyl linkage (total amount of vinyl groups and isopropenyl groups in the side chains) of the isoprene portion, was made react with tetraglycidyl metaxylenediamine in an amount equimolar to that of the butyllithium employed for polymerization of said block copolymer to obtain a terminal modified block copolymer.

Next, the terminal modified block copolymer obtained above was hydrogenated with the same rhodium system hydrogenation catalyst as described in Examples 29 to 34 to obtain a specific hydrogenated terminal modified block copolymer having a hydrogenated ratio [A] of the whole of isoprene portion of 12% and a hydrogenated ratio [B] of the vinyl linkage portion of 50%. Said block copolymer was melted and kneaded with thermoplastic polyurethanes to prepare compositions. These compositions were adhered with pressure to polyvinyl chloride sheets at 180° C., and the peeling strength was measured. The results were shown in Table 10.

In this connection, the block copolymer used in Comparative Example was obtained by treating the above-described active block copolymer having lithium at the terminal end with methanol, and no hydrogenation was applied thereon.

ples 1 to 3. To 100 parts by weight of said block copolymer were added 2 parts by weight of 2-tert-butyl-6-(3-tert-butyl-2-hydroxy-5-methylbenzyl)-4-methylphenylacrylate, and thereafter the solvent was evaporated by heating.

Next, after 100 parts by weight of the above-described specific hydrogenated block copolymer were mixed with 4 parts by weight of maleic anhydride, the mixture was fed into a vented extruder to effect the modification reaction at 260° C. The unreacted maleic anhydride was removed through the vent. The modified specific hydrogenated block copolymer was found to have an amount of grafted maleic anhdride of 0.9% by weight.

For comparison, the above-described block copolymer before hydrogenation was modified with maleic anhydride according to the same method as described above to obtain a modified unhydrogenated block copolymer with an amount of grafted maleic anhydride of 1% by weight.

Further, for comparison, according to the same hydrogenation method as described above, a completely hydrogenated block copolymer having a hydrogenated ratio [A] of the whole of butadiene portion of substantially 100% was obtained. 100 Parts by weight of said block copolymer, 2.5 parts by weight of maleic anhydride and 0.2 part by weight of a peroxide (Perhexa 25B) were mixed and then fed into a vent extruder to effect the modification reaction at 250° C. The modified

TABLE 10

|  |  | Example | | | Comparative Example | | |
| --- | --- | --- | --- | --- | --- | --- | --- |
|  |  | 35 | 36 | 37 | 32 | 33 | 34 |
| Composition formulated (parts by weight) | Specific hydrogenated terminal modified block copolymer | 10 | 60 | 90 | — | — | — |
|  | Block copolymer not hydrogenated | — | — | — | 10 | 60 | 90 |
|  | Polyurethane | 90 | 40 | 10 | 90 | 40 | 10 |
| Peeling strength (Note 9) (Kg/25 mm) |  | 12.1 | 11.4 | 8.6 | 9.5 | 5.1 | 2.8 |

Note 9: According to JIS K6854.

Examples 38-40 and Comparative Examples 35-40

A specific hydrogenated block copolymer having a hydrogenated ratio [A] of the whole of butadiene portion of 25% and a hydrogenated ratio [B] of the vinyl linkage portion of 58% was obtained by hydrogenating a block copolymer of BSBS structure containing 40% by weight of styrene and a vinyl linkage of the butadiene portion before hydrogenation of 35% with the same Ti system hydrogenation catalyst as described in Examcompletely hydrogenated block copolymer was found to have an amount of grafted maleic anhydride of 1.2% by weight.

Compositions comprising thermoplastic resins shown in Table 11 and the above modified block copolymers were prepared, and their physical properties were measured. The results were shown in Table 11, from which it can be seen that the compositions of the present invention have good impact resistance at low temperature as well as excellent heat aging resistance.

TABLE 11

|  |  | Example | | | Comparative Example | | | | | |
| --- | --- | --- | --- | --- | --- | --- | --- | --- | --- | --- |
|  |  | 38 | 39 | 40 | 35 | 36 | 37 | 38 | 39 | 40 |
| Composition formulated (parts by weight) | Modified specific hydrogenated block copolymer | 25 | 20 | 25 |  |  |  |  |  |  |
|  | Modified completely hydrogenated block copolymer |  |  |  | 25 | 20 | 25 |  |  |  |
|  | Modified unhydrogenated block copolymer |  |  |  |  |  |  | 25 | 20 | 25 |
|  | Nylon-6,6 | 75 |  |  | 75 |  |  | 75 |  |  |
|  | Polybutyleneterephthalate |  | 80 |  |  | 80 |  |  | 80 |  |
|  | Ethylene-vinyl alcohol copolymer |  |  | 75 |  |  | 75 |  |  | 75 |
| Izod | 23° C. | 118 | 5.3 | 81 | 120 | 5.5 | 83 | 110 | 4.5 | 75 |

TABLE 11-continued

|  |  | Example | | | Comparative Example | | | | |
| --- | --- | --- | --- | --- | --- | --- | --- | --- | --- |
|  |  | 38 | 39 | 40 | 35 | 36 | 37 | 38 | 39 | 40 |
| impact strength (Kg-cm/cm. notched) | −20° C. | 40 | 2.2 | 30 | 25 | 1.6 | 21 | 35 | 1.4 | 25 |
| Heat aging resistance |  | G | G | G | E | E | E | W | W | W |

Example 41 and Comparative Example 41

A mixture of 100 parts by weight of the block copolymer shown in Table 12, 50 parts by weight of a naphthenic process oil, 50 parts by weight of a polystyrene (Styron 679, produced by Asahi Kasei), 55 parts by weight of heavy calcium carbonate, 5 parts by weight of titanium oxide and 0.5 part by weight of zinc stearate was kneaded by a pressurized kneader to prepare a composition, which was then injection molded by a 5-ounce injection molding machine. The properties of the products obtained were shown in Table 12.

TABLE 12

|  | Example 41 | Comparative Example 41 |
| --- | --- | --- |
| Type of block copolymer used | Specific hydrogenated block copolymer used in Examples 17-23 | Unhydrogenated block copolymer of the left polymer |
| Tensile strength (Kg/cm²) | 40 | 30 |
| Elongation (%) | 650 | 450 |
| Flexibility at −20° C. (Note 10) | Good | Bad |
| Heat aging resistance | Good | Bad |

Note 10: After the composition was made to reside in cylinder of injection molding machine for 20 minutes, injection molding was recommenced, and judgement was done from the appearance of the molded piece of the 3rd shot after recommencement.

Examples 42–46

According to the formulation recipes shown in Table 13, compositions comprising specific hydrogenated block copolymers, thermoplastic resins and glass fibers (short fibers of diameter 9 μm, length 6 mm) were prepared. The properties of the compositions obtained are shown in Table 13.

In these experiments, the block copolymer used in Example 42 was a modified specific hydrogenated block copolymer grafted with 0.5% by weight of glycidylmethacrylic acid ester onto the same specific hydrogenated block copolymer as used in Examples 38–40. The modified specific hydrogenated block copolymer used in Examples 45 and 46 was the same as the modified specific hydrogenated block copolymer used in Examples 38 to 40 except that the amount of grafted maleic anhydride was 0.3% by weight.

TABLE 13

| Example | Specific hydrogenated block copolymer Type | Amount (parts by weight) | Thermoplastic resin Type | Amount (parts by weight) | Amount of glass fiber (parts by weight) | Izod impact strength (Kg-cm/cm notched) |
| --- | --- | --- | --- | --- | --- | --- |
| 42 | Modified specific hydrogenated block copolymer | 10 | Polyethyleneterephthalate | 65 | 25 | 19.5 |
| 43 | The same as | 10 | PSF | 65 | 25 | 18.6 |
| 44 | that used in Examples 17–23 | 10 | Polyacetal | 70 | 20 | 15.2 |
| 45 | Modified specific hydrogenated block copolymer | 10 | Nylon - 6.6 Styrene-methacrylic acid copolymer | 40 30 | 20 | 8.3 |
| 46 |  | 10 | PPE Nylon - 6 PS | 30 40 10 | 10 | 20.5 |

Example 47

Under a nitrogen gas atmosphere, 0.06 part by weight of n-butyllithium and 2 parts by weight of tetrahydrofuran were added into a cyclohexane solution containing 35 parts by weight of styrene and, after polymerization at 70° C. for one hour, a cyclohexane solution containing 7.5 parts by weight of 1,3-butadiene and 7.5 parts by weight of styrene were added thereinto to carry out polymerization at 70° C. for one hour. Then, a cyclohexane solution containing 7.5 parts by weight of 1,3-butadiene and 7.5 parts by weight of styrene was added to carry out polymerization at 70° C. for one hour, and further a cyclohexane solution containing 35 parts by weight of styrene was added to carry out polymerization at 70° C. for one hour. The block copolymer obtained was found to contain 85% by weight of styrene and a vinyl linkage of 33% in the butadiene portion.

Next, the block copolymer obtained above was hydrogenated according to the same method as described in Examples 1 to 3 to obtain a specific hydrogenated copolymer having a hydrogenated ratio [A] of the whole of butadiene portion of 45% and a hydrogenated ratio [B] of the vinyl linkage portion of 86%. To 100 parts by weight of said block copolymer were added 2 parts by weight of phenothiazine as a stabilizer.

The above specific hydrogenated block copolymer can be formulated at about 15% by weight into a polyarylate resin, a fluorine resin, a polyether ether ketone, a polyoxybenzoyl, a polyether imide, a polyamideimide, a bismaleimide resin, a polysulfone, a polyethersulfone, a polyphenylene sulfide, respectively, to change flow characteristics and modify injection moldability.

Examples 48–50 and Comparative Examples 42–46

By using the same specific hydrogenated block copolymers as in Examples 1–3, bituminous compositions were prepared.

With 90 parts by weight of straight asphalt (Stoas 68/80), 10 parts by weight of the block copolymers shown in Table 14 were formulated to prepare compositions, and their performances were evaluated. The results were shown in Table 14, from which it can be seen that the compositions of the present invention which formulate the specific hydrogenated block copolymers have excellent low temperature properties, heat aging resistance, and have good softening point and penetration.

performances of the compositions obtained are shown in Table 15.

TABLE 15

| | Specific hydrogenated block copolymer, etc. | | | | | | | | |
|---|---|---|---|---|---|---|---|---|---|
| | Polymer structure | Styrene content (wt %) | Vinyl linkage content [V] (%) | Hydrogenated ratio [A] (%) | Hydrogenated ratio [B] (%) | $\frac{[B]}{[V]^{\frac{1}{2}}}$ | Softening point (°C.) | Penetration (1/10 mm) | Low temperature property (°C.) | Heat aging resistance |
| Example 51 | BABA (Note 15) | 40 | 20 | 25 | 60 | 13.4 | 94 | 44 | −7.5 | E |
| Comp. Ex. 47 | | | | 60 | 95 | 21.2 | 98 | 58 | 5 | E |
| Example 52 | (A—B)₄Si | 30 | 55 | 40 | 65 | 8.8 | 93 | 60 | −5 | E |
| Comp. Ex. 48 | | | | 8 | 17 | 2.3 | 89 | 72 | −10 | W |

(Note 15):
Block styrene content of block copolymer before hydrogenation determined by the oxidative decomposition method by using osmium tetraoxide (L. M. Kolthoff, et al., J. Polym. Sci. 1, 429 (1946)) was about 28 wt %, with a part of styrene randomly copolymerized in a taper in the B segment.

Example 53 and Comparative Examples 49 and 50

A composition was prepared by formulating 5 parts by weight of a specific hydrogenated block copolymer of a styrene-isoprene block copolymer having ABA structure, a styrene content of 15% by weight, a block styrene content of 10% by weight, a vinyl linkage content before hydrogenation (total amount of 1,2-linkage

TABLE 14

| | Specific hydrogenated block copolymer, etc. | | | | | | Softening point (Note 11) (°C.) | Penetration (Note 12) (1/10 mm) | Low temperature property (Note 13) (°C.) | Heat aging resistance (Note 14) |
|---|---|---|---|---|---|---|---|---|---|---|
| | Polymer structure | Styrene content (wt %) | Vinyl linkage content [V] (%) | Hydrogenated ratio [A] (%) | Hydrogenated ratio [B] (%) | $\frac{[B]}{[V]^{\frac{1}{2}}}$ | | | | |
| Example | | | | | | | | | | |
| 48 | ABA | 20 | 35 | 17 | 50 | 8.5 | 82 | 40 | −25 | G |
| 49 | | | | 30 | 65 | 11.0 | 83 | 42 | −25 | E |
| 50 | | | | 45 | 80 | 13.5 | 83 | 44 | −20 | E |
| 42 | | | | 0 | 0 | 0 | 80 | 37 | −20 | W |
| Comp. Ex. | | | | | | | | | | |
| 43 | | | | 3 | 12 | 2.0 | 80 | 38 | −20 | W |
| 44 | | | | 85 | 94 | 15.9 | 84 | 48 | −10 | E |
| 45 | | | | 100 | 100 | 22.4 | 85 | 50 | −7.5 | E |
| 46 | | | 83 | 30 | 38 | 4.2 | 90 | 55 | −2.5 | G |

Note 11: According to JIS K2207, a sample was filled in a specified ring, supported horizontally in a water bath, a ball of 3.5 g was placed at the center of the sample, and when the bath temperature was elevated at a rate of 5° C./min., the temperature when the sample contacted the bottom plate of the ring stand by the weight of the ball was measured.
Note 12: According to JIS K2207, the length of a specified needle progressed into a sample maintained at 25° C. in a thermostat water tank within 5 seconds was measured.
Note 13: A test piece of 20 mm width, 150 mm length and 3 mm thickness was prepared, wound around a column rod of 15 mm diameter after cooled to a predetermined temperature, and low temperature property was judged by the highest temperature at which breaking or cracking of the test piece occurred. Low temperature property is better as the temperature is lower.
Note 14: Judged by comparison between the melt viscosity ($\eta_A$ CPS) after the composition was heated at 180° C. for one hour and the melt viscosity ($\eta_B$ CPS) after heated in air at 180° C. for 72 hours.

E: $\frac{|\eta_B - \eta_A|}{\eta_A} \leq 5$

G: $5 < \frac{|\eta_B - \eta_A|}{\eta_A} \leq 10$

W: $10 < \frac{|\eta_B - \eta_A|}{\eta_A}$

Examples 51, 52, and Comparative Examples 47 and 48

The specific hydrogenated block copolymers shown in Table 15 were formulated into straight asphalt according to the same method as in Examples 48 to 50 to prepare compositions. The results of evaluating the and 3,4-linkage) of 15%, a melt flow of about 5 g/10 min. and two tapered random copolymer portions in the B segment, with 95 parts by weight of a straight asphalt (Stoas 60/80). The results evaluating the properties of the composition obtained are shown in Table 16.

TABLE 16

| | Hydrogenation conditions | | | Softening point (°C.) | Penetration (1/10 mm) | Low temperature property (°C.) | Heat aging resistance |
|---|---|---|---|---|---|---|---|
| | Hydrogenated ratio [A] (%) | Hydrogenated ratio [B] (%) | $\frac{[B]}{[V]^{\frac{1}{2}}}$ | | | | |
| Example 53 | 15 | 60 | 15.5 | 67 | 46 | −15 | G |
| Comp. Ex. 49 | 0 | 0 | 0 | 65 | 48 | −10 | W |
| Comp. Ex. 50 | 100 | 100 | 25.8 | 70 | 53 | −7.5 | E |

Examples 54–78 and Comparative Example 51

Under a nitrogen gas atmosphere, 0.11 part by weight of n-butyllithium and 0.2 part by weight of tetrahydrofuran were added into a cyclohexane solution containing 15 parts by weight of 1,3-butadiene and 20 parts by weight of styrene, and after polymerization at 70° C. for 2 hours, further a cyclohexane solution containing 45 parts by weight of 1,3-butadiene and 20 parts by weight of styrene was added to carry out polymerization at 70° C. for 2 hours. The active terminal ends of the polymer obtained were allowed to react with the terminal treating agents shown in Table 17 in amounts equimolar to that of the n-butyllithium used for polymerization, respectively, to obtain terminal modified block copolymers containing a styrene content of 40% by weight and a vinyl linkage content in the butadiene portion of 17%.

Next, the terminal modified block copolymers obtained above were hydrogenated with the rhodium system hydrogenation catalyst as in Examples 29 to 34 as disclosed in U.S. Pat. No. 3,993,855 to obtain specific hydrogenated terminal modified block copolymers, respectively, having a hydrogenated ratio [A] of the whole of butadiene portion of about 15% and a hydrogenated ratio [B] of the vinyl linkage portion thereof of about 65%. To 100 parts by weight of these polymers, each 0.5 part by weight of 2-tert-butyl-6-(3-tert-butyl-2-hydroxy-5-methylbenzyl)-4-methylphenylacrylate and tris(2,4-di-tert-butyl-phenyl)phosphite were added, and then the solvent was evaporated by heating.

Next, according to the recipes shown below, the compositions containing the bituminous material of the present invention, and comparative compositions were obtained by mixing at 200° C. for about one hour.

| Formulation ratio of composition | Parts by weight |
|---|---|
| 20/30 Blown asphalt | 15 |
| Specific hydrogenated terminal modified block copolymer or unmodified block copolymer | 15 |
| Heavy calcium carbonate | 60 |
| Fine powdery silica | 10 |

The characteristics of the compositions obtained were shown in Table 17, from which it can be seen that the compositions of the present invention have more excellent tensile strength, tearing strength and heat aging resistance, as compared with the compositions of Comparative examples.

In this connection, the block copolymer used in Comparative Example 51 had hydrogen bonded at the terminal end which was obtained by treating the above-described block copolymer having lithium at terminal end of the polymer with methanol, and was not hydrogenated.

TABLE 17

| Example No. | Terminal treating agent | Tensile strength (Note 16) (kg/cm$^2$) | Tearing strength (Note 16) (kg/cm$^2$) | Heat aging resistance |
|---|---|---|---|---|
| 54 | 1,4-dimethyl-2-imidazolidinone | 16 | 13 | G |
| 55 | N,N'-dimethylpropyleneurea | 16 | 13 | G |
| 56 | N-methylpyrrolidone | 16 | 13 | G |
| 57 | N,N'-dicyclohexylcarbodiimide | 16 | 13 | G |
| 58 | Anizalaniline | 16 | 13 | G |
| 59 | N-methyl-ε-caprolactam | 15 | 12 | G |
| 60 | 4,4'-bis(diethylamino)benzophenone | 15 | 12 | G |
| 61 | 4,4'-bis(diethylamino)thiobenzophenone | 15 | 12 | G |
| 62 | diethylaminoethylstryrene | 14 | 11 | G |
| 63 | N,N'-dimethylformamide | 15 | 11 | G |
| 64 | N,N'-dimethylnicotinamide | 14 | 11 | G |
| 65 | N,N,N',N'-tetramethylthiourea | 14 | 11 | G |
| 66 | 4-methoxybenzylidene-4-butylaniline | 15 | 12 | G |
| 67 | diphenylcyanamide | 16 | 13 | G |
| 68 | tri(2-methyl-1 aziridinyl)phenylphosphine oxide | 15 | 11 | G |
| 69 | N,N,N',N'-tetramethylurea | 14 | 11 | G |
| 70 | 3,7-bis(dimethylamine)-10-benzoylphenothiazine | 15 | 12 | G |
| 71 | tetraglycidyl-1,3-bisaminomethylcyclohexane | 15 | 12 | G |
| 72 | propanesultone | 14 | 11 | G |
| 73 | epoxidized soybean oil | 12 | 12 | G |
| 74 | ethylene oxide | 12 | 12 | G |
| 75 | benzaldehyde | 13 | 9 | G |
| 76 | tributylchlorotin | 13 | 9 | G |
| 77 | tetraethoxysilane | 14 | 9 | G |
| 78 | ε-caprolactone | 13 | 9 | G |
| Comp. Ex. 51 | methanol | 9 | 6 | W |

Note 16: According to JIS K-6301, but tensile speed was 200 mm/min.

Examples 79, 80 and Comparative Examples 52 and 53

Compositions were obtained according to the same method as in Examples 54 to 78 except for changing partially the kind of the block copolymer, the kind of the terminal treating agent and the amounts of asphalt and the specific hydrogenated terminal modified block copolymer as shown in Table 18. The properties of the compositions obtained are shown in Table 18.

In Example 79, there was employed a specific hydrogenated terminal modified block copolymer (a hydrogenated ratio [A] of the whole of butadiene portion of 35%, and a hydrogenated ratio [B] of the vinyl linkage portion of 70%) prepared by hydrogenation of a terminally modified block copolymer which was obtained by the reaction of a block copolymer of ABAB structure having a styrene content of 30% by weight, a vinyl linkage content before hydrogenation in the butadiene portion of 20% and further having lithium bound at one terminal end, with the terminal treating agent shown in Table 18 at one molecule per one terminal lithium according to the same method as described in Examples 54 to 78. In Example 80, there was employed a specific hydrogenated terminal modified block copolymer (a hydrogenated ratio [A] of the whole of butadiene portion of 18%, and a hydrogenated ratio [B] of the vinyl linkage portion of 68%) prepared by hydrogenation of a terminally modified block copolymer which was obtained by the reaction of a block copolymer of ABA structure having a styrene content of 80% by weight, a vinyl linkage content before hydrogenation in the butadiene portion of 15% and further having lithium bound at one terminal end, with the terminal treating agent shown in Table 18 at one molecule per one terminal lithium according to the same method as described above.

The block copolymers used in Comparative Examples 52 and 53 were obtained respectively by treating the above-described block copolymers having lithium at terminal ends of the polymers, with methanol to have hydrogen atoms bonded at the terminal ends, and were not hydrogenated.

For comparison, the above-described block copolymer before hydrogenation was modified with maleic anhydride according to the same method as described above to obtain a modified unhydrogenated block copolymer having an amount of grafted maleic anhydride of 1% by weight.

Further, for comparative purpose, a completely hydrogenated block copolymer having a hydrogenated ratio [A] of the total of butadiene portion of substantially 100% was obtained according to the same hydrogenation method as described above. After 100 parts by weight of said block copolymer, 2.5 parts by weight of maleic anhydride and 0.2 part by weight of a peroxide (Perhexa 25B) were mixed together, the mixture was fed into a vented extruder to carry out the modification reaction at 250° C. The modified completely hydrogenated block copolymer was found to have an amount of grafted maleic anhydride of 1.2% by weight.

According to the following recipe, the compositions containing the bituminuous material, of the present invention and of Comparative Examples, were obtained respectively by mixing the block copolymers and the materials at 200° C. for about one hour.

TABLE 18

|  |  | Example 79 | Comp. Ex. 52 | Example 80 | Comp. Ex. 53 |
|---|---|---|---|---|---|
| Terminal treating agent | | 1,3-dimethyl-2-imidazolidinone | methanol | tetraglycidyl metaxylenediamine | methanol |
| Amount (parts by weight) | Asphalt | 25 | | 10 | |
| | Block copolymer | 5 | | 20 | |
| Tensile strength (kg/cm²) | | 13 | 8 | 35 | 18 |
| Tearing strength (kg/cm²) | | 7 | 4 | 28 | 15 |
| Heat aging resistance | | E | W | G | W |

Example 81 and Comparative Examples 54 and 55

A block copolymer of BABA structure having a styrene content of 40% by weight and a vinyl linkage content in the butadiene portion of 35% was hydrogenated with the same Ti system hydrogenation catalyst as described above to obtain a specific hydrogenated block copolymer having a hydrogenated ratio [A] of the whole of butadiene portion of 25% and a hydrogenated ratio [B] of the vinyl linkage portion of 58%. To 100 parts by weight of said block copolymer were added 2 parts by weight of 2-tert-butyl-6-(3-tert-butyl-2-hydroxy-5-methylbenzyl)-4-methylphenyl acrylate, and then the solvent was evaporated by heating.

Next, after 100 parts by weight of the above-described specific hydrogenated block copolymer and 4 parts by weight of maleic anhydride were mixed, the mixture was fed into a vented extruder and the modification reaction was carried out at 260° C. The unreacted maleic anhydride was removed through the vent. The modified specific hydrogenated block copolymer obtained was found to contain an amount of grafted maleic anhydride added of 0.9% by weight.

| Formulation ratio of composition | Parts by weight |
|---|---|
| 20/30 Blown asphalt | 20 |
| Modified specific hydrogenated block copolymer, etc. | 10 |
| Heavy calcium carbonate | 60 |
| Fine powdery silica | 10 |

The characteristics of the compositions obtained were shown in Table 19.

TABLE 19

|  | Example 81 | Comp. Ex. 54 | Comp. Ex. 55 |
|---|---|---|---|
| Type of block copolymer used | Modified specific hydrogenated block copolymer | Modified completely hydrogenated block copolymer | Modified unhydrogenated block copolymer |
| Tensile strength (kg/cm²) | 16 | 17 | 15 |
| Tearing strength (kg/cm²) | 13 | 13 | 12 |
| Flexibility at −20° C. | Good | Inferior | Good |
| Heat aging resistance | E | E | W |

Example 82

An asphalt containing composition was prepared, comprising 25 parts by weight of the same modified specific hydrogenated block copolymer as used in Example 81, 40 parts by weight of a straight asphalt (Stoas 80/100), 25 parts by weight of an aliphatic petroleum resin (Quinton U-185, produced by Nippon Zeon) and 10 parts by weight of a polyethylene wax. Said composition was sandwiched between a cotton canvas and a steel plate, and was adhered with pressure by means of pressure rolls at 150 20 C. Said composition exhibited a peeling strength of 7 kg/25 mm.

Example 83

A rubber asphalt was prepared by mixing 95 parts by weight of a 60/80 straight asphalt and 5 parts by weight of the same specific hydrogenated block copolymer as used in Example 49. Next, an asphalt combined material for road pavement was prepared by mixing the rubber asphalt with aggregates at about 200° C. The aggregates were formulated so that the content of the rubber asphalt as a binder in the combined material was about 5% by weight.

The combined material had heat aging resistance, stability, low temperature characteristic and abrasion resistance, and was suitable as the asphalt mixture for road pavement.

We claim:

1. A composition comprising,
   (a) 1 to 99 parts by weight of a specific hydrogenated product of a block copolymer having at least one polymer block composed mainly of a vinyl aromatic compound and at least one polymer block composed mainly of a conjugated diene compound, a modified product thereof, which comprises said specific hydrogenated product having grafted thereon 0.01 to 50 parts by weight per 100 parts by weight of the block copolymer of an $\alpha, \beta$-unsaturated carboxylic acid or the anhydride, the esterified product, the amidated product or the imidated product thereof, or a mixture of said product and said modified product, wherein the content of the vinyl aromatic compound prior to hydrogenation is 5 to 95% by weight and the content of vinyl linkages prior to hydrogenation which originated from the conjugated diene compound is 10 to 80%, said product satisfying the following conditions;
   (1) the hydrogenated ratio of the total of aliphatic double bonds which originated from the conjugated diene compound is not lower than 5% and lower than 50%, and $[B]/[V]^{\frac{1}{2}} = 3$ to 20 wherein [B] is the hydrogenated ratio of the vinyl linkage portions which originated from the conjugated diene compound, and
   (b) 99 to 1 parts by weight of at least one thermoplastic substance selected from the group consisting of tackifier resins, thermoplastic resins excluding tackifier resins and bituminous materials.

2. The composition according to claim 1, wherein when the thermoplastic substance of component (b) is the tackifier resin, the amount of component (b) is 20 to 200 parts by weight per 100 parts by weight of component (a), and wherein when the thermoplastic substance of component (b) is the thermoplastic resins or the bituminous materials, the weight ratio of component (a) to component (b) is 99/1 to 1/99.

3. The composition according to claim 1, wherein component (a) is the modified product of the specific hydrogenated product.

4. The composition according to claim 2, wherein component (a) is the modified product of the specific hydrogenated product.

5. The composition according to claim 2, wherein at least one member of the $\alpha, \beta$-unsaturated carboxylic acid or the derivates thereof is selected from the group consisting of maleic acid, maleic anhydride, maleinimide, fumaric acid, itaconic acid, acrylic acid, methacrylic acid, acrylic acid ester, methacrylic acid ester, crotonic acid, a cis-4-cyclohexene-1,2-dicarboxylic acid, or an anhydride or an imide thereof, and an endo-cis-bicyclo-[2,2,1]-5-heptene-2,3-dicarboxylic acid, or an anhydride or an imide thereof.

6. The composition according to claim 3, wherein at least one member of the $\alpha, \beta$-unsaturated carboxylic acid or the derivates thereof is selected from the group consisting of maleic acid, maleic anhydride, maleinimide, fumaric acid, itaconic acid, acrylic acid, methacrylic acid, acrylic acid ester, methacrylic acid ester, crotonic acid, a cis-4-cyclohexene-1,2-dicarboxylic acid and anhydride or an imide thereof, and an endo-cis-bicyclo-[2,2,1]-5-heptene-2,3-dicarboxylic acid, or an anhydride or an imide thereof.

7. The composition according to claim 4, wherein at least one member of the $\alpha, \beta$-unsaturated carboxylic acid or the derivates thereof is selected from the group consisting of maleic acid, maleic anhydride, maleinimide, fumaric acid, itaconic acid, acrylic acid, methacrylic acid, acrylic acid ester, methacrylic acid ester, crotonic acid, a cis-4-cyclohexene-1,2-dicarboxylic acid, or an anhydride or an imide thereof, and an endo-cis-bicyclo-[2,2,1]-5-heptene-2,3-dicarboxylic acid, or an anhydride or an imide thereof.

8. The composition according to claim 1, wherein the block copolymer of component (a) comprises a polar group which comprises at least one atom selected from the group consisting of N, O, Si, P, S and Sn bonded to at least one terminal end of the polymer chain.

9. The composition according to claim 2, wherein the block copolymer of component (a) comprises a polar group which comprises at least one atom selected from the group consisting of N, O, Si, P, S and Sn bonded to at least one terminal end of the polymer chain.

10. The composition according to claim 9, wherein at least one member of the polar group is selected from the group consisting of carboxyl group, carbonyl group, thiocarbonyl group, acid halide group, acid anhydride group, carboxylic acid group, thiocarboxylic acid group, aldehyde group, thioaldehyde group, carboxylic acid ester group, amide group, sulfonic acid group, sulfonic acid ester group, phosphoric acid group, phosphoric acid ester group, amino group, imino group, nitrile group, pyridyl group, quinoline group, epoxy group, thioepoxy group, sulfide group, isocyanate group, isothiocyanate group, silicon halide group, alkoxy silicon group, tin halide group, alkyltin group and phenyltin group.

11. The composition according to claim 1, wherein the content of the vinyl aromatic compound in the block copolymer is in the range of 5 to 60% by weight.

12. The composition according to claim 2, wherein the content of the vinyl aromatic compound in the block copolymer is in the range of 5 to 60 % by weight.

13. The composition according to claim 1, wherein the content of the vinyl aromatic compound in the block copolymer is in the range higher than 60% and not higher than 95% by weight.

14. The composition according to claim 2, wherein the content of the vinyl aromatic compound in the block copolymer is in the range higher than 60% and not higher than 95% by weight.

15. The composition according to claim 1, wherein component (b) is at least one tackifier resin selected from the group consisting of terpene type resin, an aromatic-compound-modified terpene type resin, an alicyclic saturated-petroleum resin, a rosin ester, a disproportionated rosin ester, a completely hydrogenated rosin ester, an aliphatic petroleum resin, an aromatic petroleum resin and a modified aliphatic petroleum resin.

16. The composition according to claim 2, wherein component (b) is at least one tackifier resin selected from the group consisting of a terpene type resin, aromatic-compound-modified terpene type resin, an alicyclic saturated hydrocarbon resin, a rosin ester, disproportionated rosin ester, a completely hydrogenated rosin ester, an aliphatic petroleum resin, an aromatic petroleum resin and a modified aliphatic petroleum resin.

17. The composition according to claim 1, wherein component (b) is the tackifier resin and which comprises 5 to 100 parts by weight of a softener per 100 parts by weight of component (a).

18. The composition according to claim 2, wherein component (b) is the tackifier resin and which comprises 5 to 100 parts by weight of a softener per 100 parts by weight of component (a).

19. The composition according to claim 16, wherein component (b) is the tackifier resin and which comprises 5 to 100 parts by weight of a softener per 100 parts by weight of component (a).

20. The composition according to claim 2, wherein component (b) is at least one thermoplastic resin excluding tackifier resin selected from the group consisting of polymers comprising an aliphatic unsaturated carboxylic acid or a derivative thereof, polyamide, polyesters, thermoplastic polyurethane, vinyl alcohol polymers, polyoxymethylene polymers, polycarbonates, polysulfones, polyphenylene ethers, polyarylenesulfides, polyketones, polyarylates, fluorine resins, polyoxybenzoyl resins and polyimides.

21. The composition according to claim 2, wherein component (b) is a thermoplastic resin excluding tackifier resin and which comprises 1 to 200 parts by weight of an inorganic filler, an organic filler or a mixture thereof, and 0 to 200 parts by weight of a softener per 100 parts by weight of component (a).

22. The composition according to claim 20, wherein component (b) is a thermoplastic resin excluding tackifier resin and which comprises 1 to 200 parts by weight of an inorganic filler, an organic filler or a mixture thereof, and 0 to 200 parts by weight of a softener per 100 parts by weight of the component (a).

23. The composition according to claim 21, wherein at least one member of the inorganic filler is selected from the group consisting of calcium carbonate, clay, silica, zinc white, magnesium carbonate, magnesium silicate, talc, diatomaceous earth, dolomite, mica powder, aluminium sulfate, barium sulfate, graphite, glass fiber and carbon black, and wherein at least one member of the organic filler is selected from the group consisting of a resin having high styrene content, a coumaroneindene resin, a phenol formaldehyde resin, a modified melamine resin, a petroleum resin, lignin, wood powder and carbon fiber.

24. The composition according to claim 22, wherein at least one member of the inorganic filler is selected from the group consisting of calcium carbonate, clay, silica, zinc white, magnesium carbonate, magnesium silicate, talc, diatomaceous earth, dolomite, mica powder, aluminium sulfate, barium sulfate, graphite, glass fiber and carbon black, and wherein at least one member of the organic filler is selected from the group consisting of a resin having high styrene content, a coumaroneindene resin, a phenol formaldehyde resin, a modified melamine resin, a petroleum resin, lignin, wood powder and carbon fiber.

25. The composition according to claim 2, wherein component (b) is at least one bituminous material selected from the group consisting of straight asphalt, semi-blown asphalt, blown asphalt, tar, pitch, cutback asphalt and asphalt emulsion.

26. The composition according to claim 2, which comprises 0.01 to 5 parts by weight per 100 parts by weight of component (a) of at least one phenolic stabilizer having the following formulae of [I] to [VII]:

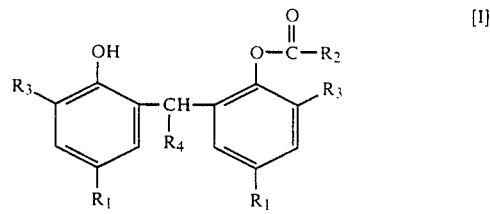

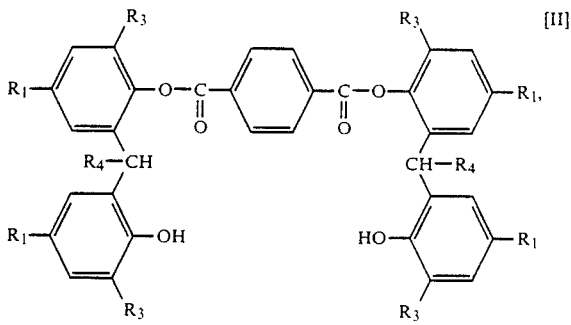

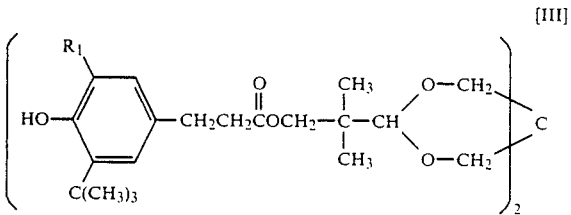

wherein $R_1$ represents an alkyl group having 1 to 4 carbon atoms, $R_2$ represents an alkenyl group having 2 to 4 carbon atoms, $R_3$ represents a tert-butyl group or a cyclohexyl group and $R_4$ represents hydrogen or an alkyl group having 1 to 18 carbon atoms.

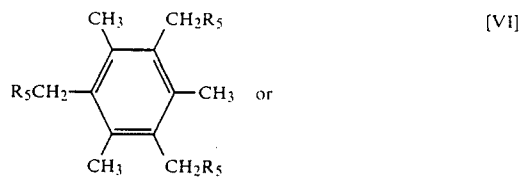

-continued

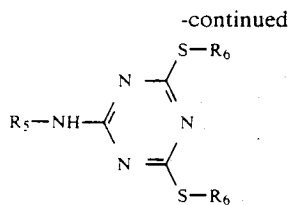  [VII]

wherein R₅ represents

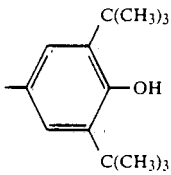

and R₆ represents an alkyl group having 2 to 22 carbon atoms.

27. A composition according to claim 2 or 26, which comprises 0.01 to 5 parts by weight of at least one phosphoruscontaining stabilizer selected from the group consisting of tri(nonylphenyl)-phosphite, cyclic neopentane-tetraylbis(octadecylphosphite), tris(2,4-di-tert-butylphenyl)phosphite, 4,4-butylidene-bis(3-methyl-6-tert-butylphenyl-di-tridecyl)phosphite, 4,4'-biphenylenediphosphinic acid tetrakis(2,4-ditert-butylphenyl) and cyclic neopentane-tetrayl-bis(2,4-ditert-butylphenyl)phosphite per 100 parts by weight of component (a).

28. A composition according to claim 2 or 26, which comprises 0.01 to 5 parts by weight per 100 parts by weight of component (a) of at least one sulfur-containing stabilizer selected from the group consisting of dilauryl-3,3'-thiodipropionic acid ester, dimyristyl-3,3'-thiodipropionic acid ester, distearyl-3,3,'-thiodipropionic acid ester, laurylstearyl-3,3'-thiodi-propionic acid ester, ditridecyl-3,3'-thiodipropionic acid ester and the compounds represented by the following formulae [VIII], [IX]:

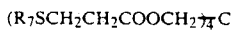 [VIII]

-continued

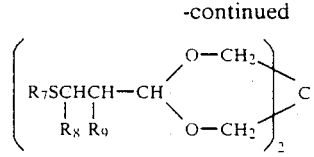 [IX]

wherein R₇ represents an alkyl group having 3 to 20 carbon atoms; R₈ and R₉ each represent hydrogen or an alkyl group having 1 to 18 carbon atoms.

29. A process for producing a composition comprising,
(a) 1 to 99 parts by weight of a specific hydrogenated product of a block copolymer having at least one polymer block composed mainly of a vinyl aromatic compound and at least one polymer block composed mainly of a conjugated diene compound, a modified product thereof, which comprises said specific hydrogenated product having grafted thereon 0.01 to 50 parts by weight per 100 parts by weight of the block copolymer of an α,β-unsaturated carboxylic acid or the anhydride, the esterified product, the amidated product or the imidated product thereof, or a mixture of said product and said modified product, wherein the content of the vinyl aromatic compound prior to hydrogenation is 5 to 95% by weight and the content of vinyl linkages prior to hydrogenation which originated from the conjugated diene compound is 10 to 80%, said product satisfying the following conditions;
(1) the hydrogenated ratio of the total of aliphatic double bonds which originated from the conjugated diene compound is not lower than 5% and lower than 50%, and $$[B]/[V]^1 = 3 \text{ to } 20. \quad (2)$$

wherein [B] is the hydrogenated ratio of the vinyl linkage portions which originated from the conjugated diene compound, and
(b) 99 to 1 parts by weight of at least one thermoplastic substance selected from the group consisting of tackifier resins, thermoplastic resins excluding tackifier resins and bituminous materials, which comprises mixing component (a) with component (b).

* * * * *